United States Patent
Bandyopadhyay et al.

(10) Patent No.: US 9,458,296 B2
(45) Date of Patent: Oct. 4, 2016

(54) DRY ICE ASSISTED POLYMER PROCESSING, METHODS FOR MAKING, AND ARTICLES FORMED THEREOF

(75) Inventors: Sumanda Bandyopadhyay, Bangalore (IN); Sadasivam Gopalakrishnan, Tamil Nadu (IN); Sathish Ranganathan Kumar, Tamil Nadu (IN); Kaushik Banik, Bangalore (IN); Zahir Bashir, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 938 days.

(21) Appl. No.: 13/602,460

(22) Filed: Sep. 4, 2012

(65) Prior Publication Data

US 2014/0061966 A1 Mar. 6, 2014

(51) Int. Cl.
B29C 47/76 (2006.01)
C08J 3/20 (2006.01)
B29C 47/38 (2006.01)

(52) U.S. Cl.
CPC ............... *C08J 3/203* (2013.01); *B29C 47/38* (2013.01)

(58) Field of Classification Search
USPC ....... 264/102, 464, 140, 141, 142, 143, 145, 264/148, 151, 176.1, 182, 209.3, 211.12, 264/211.13
See application file for complete search history.

(56) References Cited

U.S. PATENT DOCUMENTS

| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,512,606 | A | 6/1950 | Bolton et al. |
| 3,621,091 | A | 11/1971 | Hertz et al. |
| 4,154,712 | A | 5/1979 | Lee, Jr. |
| 4,806,297 | A | 2/1989 | Brown et al. |
| 4,921,656 | A | 5/1990 | Daumit et al. |
| 4,933,128 | A | 6/1990 | Daumit et al. |

(Continued)

FOREIGN PATENT DOCUMENTS

| EP | 0645232 A1 | 3/1995 |
| WO | 9425242 A1 | 11/1994 |

OTHER PUBLICATIONS

International Search Report for International Application No. PCT/IB2012/056808; Date of Mailing: May 29, 2013; 5 pages.

(Continued)

*Primary Examiner* — Stella Yi
(74) *Attorney, Agent, or Firm* — Cantor Colburn LLP

(57) ABSTRACT

In an embodiment, a method of processing a polymer comprises: mixing polymer and solid carbon dioxide; introducing the polymer and solid carbon dioxide mixture to a hopper of a vented extruder; plasticizing the mixture to form a polymer melt with dissolved carbon dioxide; venting carbon dioxide as a gas before the die exit; and extruding the polymer melt through a die. In an embodiment, a method of making an article comprises: introducing a polymer powder to an extruder; introducing solid carbon dioxide powder to the extruder at the hopper; plasticizing and extruding the polymer and solid carbon dioxide mixture; venting the solid carbon dioxide before the die exit; extruding the polymer melt through a die to form pellets; and injection molding the polymer pellets without solid carbon dioxide to form molded articles.

27 Claims, 8 Drawing Sheets

(56) References Cited

U.S. PATENT DOCUMENTS

| | | | |
|---|---|---|---|
| 4,935,180 A * | 6/1990 | Daumit et al. | 264/85 |
| 4,970,272 A | 11/1990 | Gallucci | |
| 5,132,365 A | 7/1992 | Gallucci | |
| 6,117,542 A | 9/2000 | Nanba et al. | |
| 6,361,724 B1 | 3/2002 | Maeda et al. | |
| 6,593,411 B2 | 7/2003 | Koevoets et al. | |
| 7,226,963 B2 | 6/2007 | Koevoets et al. | |
| 2006/0194116 A1* | 8/2006 | Suzuki et al. | 429/251 |
| 2009/0110905 A1 | 4/2009 | Starostenko | |
| 2011/0024939 A1 | 2/2011 | Alves | |
| 2011/0245398 A1 | 10/2011 | Hama et al. | |

OTHER PUBLICATIONS

Written Opinion of the International Searching Authority for International Application No. PCT/IB2012/056808; Date of Mailing: May 29, 2013; 5 pages.

Anonymous: "Use of solid carbon dioxide (Dry Ice) to reduce gels and volatiles in polypropylene impact copolymers", Research Disclosure, Mason Publications, Hampshire, GB, vol. 434, No. 59, Jun. 1, 2000, XP007126263, ISSN: 0374-4353 abstract.

Michael J. Bortner et al., "Absorption of CO2 and subsequent viscosity reduction of an acrylonitrile copolymer" Department of Chemical Engineering and Center for Composite Materials and Structures, Virginia Polytechnic Institute and State University; Polymer 45 (2004) 3399-3412; 14 pages.

Manuel Garcia-Leiner et al., "Co2-Assisted Polymer Processing: A New Alternative for Intractable Polymers", Polymer Science and Engineering Department, University of Massachusetts; 2004; 11 pages.

Xiaosong Huang, "Fabrication and Properties of Carbon Fibers" Chemical Sciences & Materials Systems Laboratory, General Motors Research & Development Center, Warren, MI; Materials 2009, 2, 2369-2403; 35 pages.

Nalawade et al., "Supercritical carbon dioxide as a green solvent for processing polymer melts: Processing aspects and applications" Department of Chemical Engineering, University of Groningen, Gronigen, The Netherlands; Prog. Polym. Sci 31 (2006) 19-43; 25 pages.

Quang T. Nguyen et al., "An improved technique for exfoliating and dispersing nanoclay particles into polymer matrices using supercritical carbon dioxide" Department of Chemical Engineering, Virginia Polytechnic Institute and State University, Blacksburg, VA; Polymer 48 (2007) 6923-6933, 11 pages.

Yang Zhao et al., "Dynamic rheology and microstructure of polyproplyene/clay nanocomposites prepared under Sc—CO2 by melt compounding" Center for Polymer Processing Equipment and Intellectualization, College of Industrial Equipment and Control Engineering, South China University of Technology; Polymer Testing 27 (2008) 129-134; 6 pages.

Brito Junior et al., "Pan Fibers Obtained by Extrusion Process using Glycerin as Plasticizer" Technological Institute of Aeronautics, Sao Jose dos Campos, Brazil, 5 pages.

Steven S. Zumdahl, "The Phase Diagram for Carbon Dioxide" University of Illinois, Chemistry, Fourth Edition, 1997; Chapter 10.9, p. 491; 1 page.

Michael J. Bonner, "Melt Processing of Metastable Acrylic Copolymer Carbon Precursors" Dissertation submitted to the Faculty of Virginia Polytechnic Institute and State University in partial fulfillment of the requirements for the degree of Doctor of Philosophy in Chemical Engineering; 2003, 329 pages.

Minhee Lee, "Extrusion of Polymers and Polymer Blends with Supercritical Carbon Dioxide" A Thesis presented to the University of Waterloo in fullfillment of the thesis requirement for the degree of Doctor of Philosophy in Chemical Engineering; Waterloo, Ontario, Canada, 1999; 316 pages.

* cited by examiner

DRY ICE ASSISTED POLYMER PROCESSING, METHODS FOR MAKING, AND ARTICLES FORMED THEREOF

TECHNICAL FIELD

The present disclosure relates generally to processing various polymers with the use of dry ice (i.e., card ice, solid carbon dioxide).

BACKGROUND

Polymers having a high viscosity and/or a high glass transition temperature can be challenging to process via injection molding or extrusion. High temperature and high pressure are often needed in order to process these materials because of the high glass transition temperature and/or the high viscosity. Polymers with polar groups and high chain rigidity generally have high glass transition temperatures (Tg) and/or high melt viscosities compared with non-polar polymers, or polymers with flexible backbones. Such polymers may not be extrudable in the melt, or can be processed with difficulty using various aids, or can be converted into a limited number of shapes and products by special methods. Often with such polymers, the temperatures needed for melt extrusion overlap with the degradation temperature. For example, polyphenylene ether, a polymer with an aromatic ring on the chain backbone, has a high glass transition temperature of 210° C. to 220° C. along with a high melt viscosity, and generally has to be extruded at temperatures of 290° C. to 330° C. But continuous melt extrusion of pure polyphenylene ether is not possible because degradation occurs simultaneously at the extrusion temperature. Polycarbonates have a glass transition temperature of 140° C. to 220° C., and generally have to be extruded at temperatures of 260° C. to 300° C. Polycarbonate is thermally stable enough for continuous melt extrusion but its melt viscosity is high, and it does not shear-thin significantly even at high shear rates due to its narrow molecular weight distribution.

Vinyl polymers with polar groups, such as polyvinyl chloride (PVC) polyacrylonitrile (PAN), and polytetrafluoroethylene (PTFE), also have high glass transition temperatures and high melting points. For example, PVC cannot be extruded without thermal stabilizers and/or lubricants. PTFE cannot be extruded at all with a screw extruder; rather, it is processed into a limited number of shapes via ram extrusion. Polyacrylonitrile (PAN) is made into fibers through solution (i.e., wet) spinning as it is not extrudable with a screw extruder at all. The products made from PAN are therefore limited to fine fibers since other articles cannot be made from a solution process, due to the difficulty of extracting the solvent or plasticizer from a thick or massive shape.

It can be desirable, therefore, to have new ways to process intractable polymers with polar groups and/or rigid aromatic backbones, allowing a range of products including fibers, films, and/or profiles, to be made.

Processing, e.g., injection molding of polymers at high temperatures and/or high pressures can be undesirable for several reasons, including, an increase in cycle time, an increase in brittle failure of molded samples, an increase in yellowness, etc. Therefore, ways to process high temperature polymers at lower temperatures and pressures, which therefore lower cycle time, lower cost, increase ductility, and/or decrease yellowing of the polymers, are continually desired.

In some cases, the polymer degradation temperature overlaps with the extrusion temperature, and for practical purposes, the polymer can be considered non melt-processable. Examples of such polymers are 2,6 disubstituted polyphenylene ethers (PPO) and polyacrylonitrile (PAN).

Polyphenylene ether is also called polyphenylene oxide, and is a generic term used to cover a family of polymers, having an aromatic ether in the chain backbone (Scheme 1).

Scheme 1

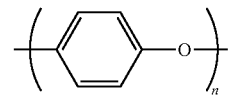

The industrially produced polymers of this family are the 2,6 disubstituted polyphenylene ethers derived for example from the oxidative coupling of 2,6 disubstituted phenol, with the formula of Scheme 2, where R can be an alkyl or phenyl group.

Scheme 2

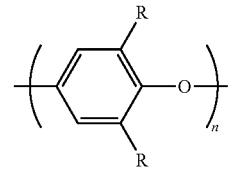

The most common of these is the 2,6 disubstituted polyphenylene ether where $R=CH_3$ (Scheme 3).

Scheme 3

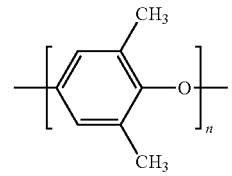

The polymer in Scheme 3 is called poly(2,6-dimethyl-1,4-phenylene ether) or poly(2,6-dimethyl-1,4-phenylene oxide). As described herein, the polymer in Scheme 3 will be simply called polyphenylene oxide or PPO.

Neat PPO (i.e., pure PPO) can be extruded in the melt for a short period of time, as the polymer seizes shortly after entry into the extruder and becomes an unextrudable block due to degradation. Hence, to overcome this problem, PPO is seldom processed as a neat resin, and instead is compounded with various other thermoplastics, such as polystyrene, which is miscible with PPO at all concentrations. Extrudability is however gained at the expense of the properties of neat PPO. Neat PPO has a Tg of 215° C.; blending with polystyrene inevitably lowers this value. Lowering the Tg of neat PPO compromises the potential properties of the neat resin. If neat PPO can be processed at or above the Tg, it would allow the production of molded articles with a heat deflection temperature (HDT) that is double that found in most other polymers. As this has not been possible, PPO blends with depressed Tgs are generally used for injection molding. U.S. Pat. No. 3,621,091 describes the spinning and drawing of neat PPO fibers, but to achieve this, wet spinning had to be used. The neat PPO fibers after drawing had desirable properties, but due to the difficulties and economics of wet spinning, such PPO fibers have never been commercialized.

Another polymer whose degradation temperature overlaps with its melting temperature is PAN. In fact, the situation is even more extreme than with PPO, because the viscosity of PAN is even higher than neat PPO. Fibers made from acrylic polymers such as polyacrylonitrile are often used as a precursor in the formation of carbon fibers. However, PAN homopolymer cannot be melt spun as it degrades at the temperatures needed to extrude it. PAN has a thermoplastic regime from 150° C. to 200° C., but it is very viscous. Melt spinning of polyacrylonitrile homopolymer into fibers is therefore virtually impossible due to the exceptionally high melt viscosity, which arises due to intermolecular nitrile dipole-dipole interaction. Raising the temperature above 200° C. does not decrease the viscosity of PAN much, and moreover is dangerous as PAN undergoes concerted nitrile cyclization and crosslinking reactions which are very exothermic. Thus, to date, the only commercially-used processes for PAN are based on wet spinning with solution concentrations of about 10 wt. % to 15 wt. % of solvent, which is undesirable because of the cost of handling and recovering toxic solvents.

Another method to overcome the melt viscosity of PAN so that it can be processed is via plasticized melt extrusion and spinning, using plasticizers such as propylene carbonate, glycerine, and ethylene glycol. Plasticized extrusion is a pseudo-melt process because solvent is present, but high polymer contents can be used (e.g., 40% to 80% solids) and extruder spinning is possible. In a plasticized fiber melt spinning process, the plasticizer still has to be removed and recovered. However, since plasticizers, such as propylene carbonate, have a high boiling point, the fibers need to be heated to a high temperature to remove it. The use of such plasticized polymers allows for injection molding of PAN, but the mechanical properties of the polymer change as the plasticizer evaporates. For example, as the plasticizer evaporates, the Tg increases and the polymer becomes rigid and brittle.

Yet another way to lower the viscosity of PAN and make it melt processable has been to make a copolymer with greater than 15% comonomer (e.g., methacrylate, vinyl acetate, etc.). In this case, the PAN copolymer can be extruded and even melt spun into fibers without solvent or plasticizers. However, the incorporation of so much comonomer reduces the mechanical properties of the PAN copolymer fibers, and thereby of the carbon fibers obtained from them. Thermoplastic high nitrile polymers with high gas barrier can be achieved by using another nitrile containing comonomer (e.g., methacrylonitrile), which allowed melt extrusion of films with high barrier properties. However, a methacrylonitrile-acrylonitrile copolymer would not be good as a carbon fibers precursor, as it is not as orientable and ordered as an acrylonitrile polymer.

Neat PAN can be extruded, but not through fine capillaries, but rather into profiles through dies where the reduction in cross section is low (i.e., rods rather than fibers). However, to achieve this, the extrusion rates have to be very low, typically a few centimeters per minute.

Due to the above considerations, it can be desirable to allow processing of a range of valuable polymers whose extrusion temperatures overlap with their degradation temperatures. It can further be desirable to reduce the time which the polymer is exposed to high temperatures and/or to allow a full range of products from fibers, films, rods, tubes, profiles, injection molded articles, etc. to be made from these difficult, but valuable polymers.

Under ambient temperatures and pressures, carbon dioxide is a gas. If the gas is cooled below −78° C., carbon dioxide changes directly from a gas to a white solid (dry ice) without liquefaction, through a process called deposition. At atmospheric pressure, solid carbon dioxide converts to gaseous carbon dioxide without passing through a melting stage through a process called sublimation. Liquid carbon dioxide forms only at pressures above 0.52 MegaPascals (MPa). One way to make solid carbon dioxide is to take liquid carbon dioxide that has been pressurized and stored in a tank and allow it to expand into the natural atmosphere; this leads to deposition of a snow which consists of a fine powder of solid carbon dioxide. The fine powder can be compacted into a rod or strand and pelletized. The critical point for carbon dioxide is reached at a temperature of 304 Kelvins (K) (31° C.) and a pressure of 7.38 MPa; at temperatures and pressures above these, carbon dioxide is in a supercritical state. In this supercritical state, carbon dioxide has a density like a liquid but flows like a gas (i.e., it has the low viscosity of a gas).

SUMMARY

In an embodiment, a method of processing a polymer comprises: mixing polymer and solid carbon dioxide; introducing the polymer and solid carbon dioxide mixture to a hopper of a vented extruder; plasticizing the mixture to form a polymer melt with dissolved carbon dioxide; venting carbon dioxide as a gas before the die exit; and extruding the polymer melt through a die.

In an embodiment, a method of making a polymer comprises: introducing a pre-mixed polymer and solid carbon dioxide mixture to a vented extruder; plasticizing the mixture; venting gas from the extruder; and extruding the polymer through a die.

In an embodiment, a method of making an extrudate comprises: plasticizing a polymer with solid carbon dioxide to form a melt; venting gaseous carbon dioxide before a die exit; and extruding the melt through a die to form the extrudate.

In an embodiment, a method of making an article comprises: introducing a polymer powder to an extruder; introducing solid carbon dioxide powder to the extruder at the hopper; plasticizing and extruding the polymer and solid carbon dioxide mixture; venting the solid carbon dioxide before the die exit; extruding the polymer melt through a die to form pellets; and injection molding the polymer pellets without solid carbon dioxide to form molded articles.

BRIEF DESCRIPTION OF THE DRAWINGS

Refer now to the figures, which are exemplary embodiments, and wherein the like elements are numbered alike.

DETAILED DESCRIPTION

Figure 1:
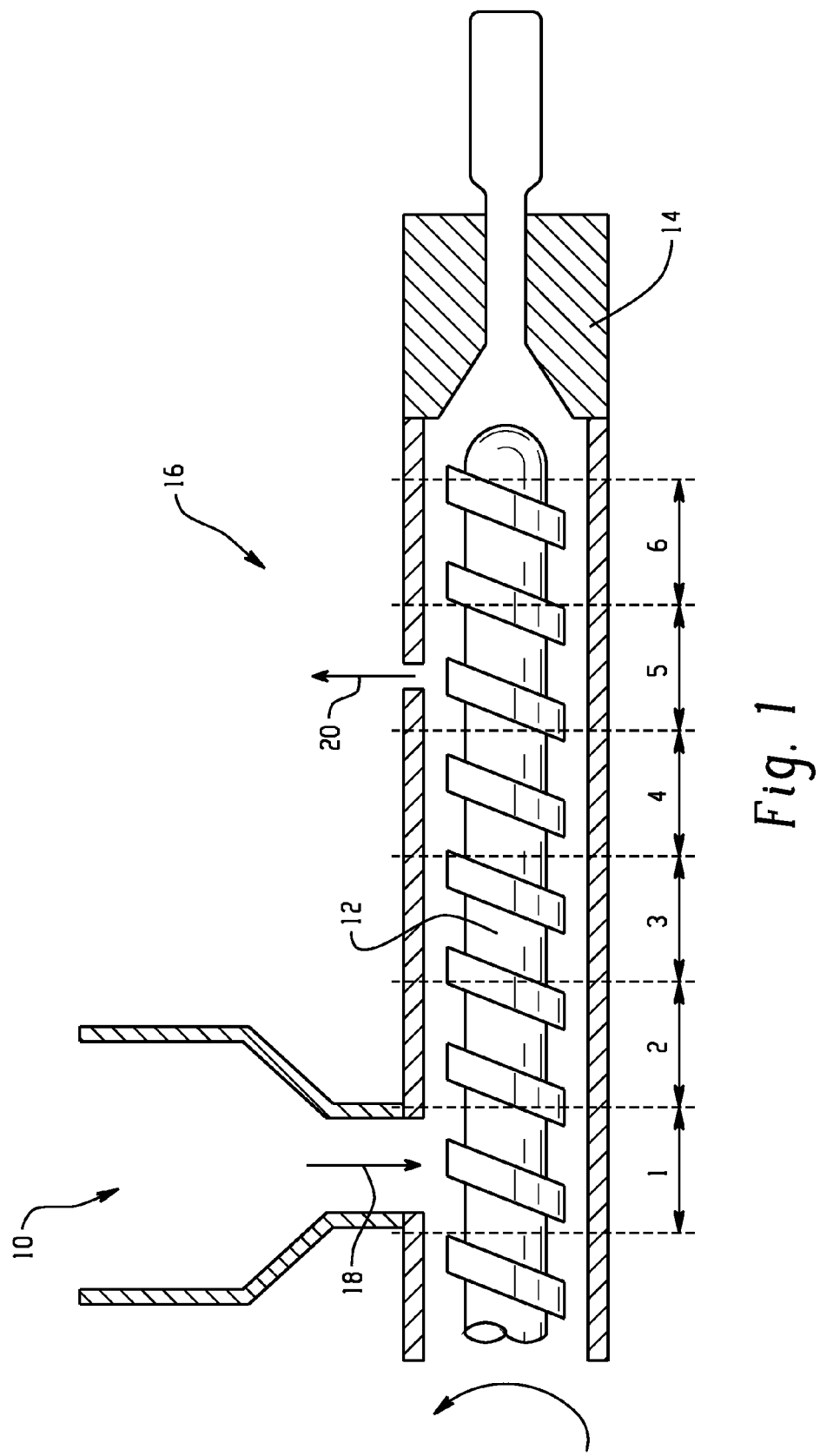
FIG. 1 is a side view of an extruder schematic where the vent in located at the fifth barrel segment.

The processes disclosed herein using solid carbon dioxide (e.g., as a coolant and/or plasticizer) in the formation of various polymers can reduce processing temperatures, thereby reducing energy consumption, and increasing productivity. At the point of introduction, the polymer is cooled by the solid carbon dioxide, while $CO_2$ concurrently diffuses into the polymer. Solid carbon dioxide, dry ice, and solid $CO_2$, are terms used interchangeably throughout the application. Carbon dioxide is the second-most abundant solvent and the second-cheapest solvent in the world. The use of solid carbon dioxide can also allow the fabrication of a wide variety of articles from various polymers such as neat PAN, neat PPO, and neat polyvinyl chloride which was not hitherto feasible, thus extending applications for these polymers to profiles of various cross sections (e.g., rods, tubes, etc.), along with fine filaments and films. The solid carbon dioxide used can be generated fresh, but for environmental reasons, generally dry ice made from recycled $CO_2$ can be used. Thus, apart from any $CO_2$ gas that might be generated from the production of the electricity needed to make dry ice from gaseous $CO_2$, there is no net $CO_2$ increase when $CO_2$ is used for plasticized extrusion.

With the methods disclosed herein it can be possible to process polymers with polar groups and/or backbones with aromatic rings, which are normally not melt-extrudable because their degradation temperature overlaps with the melting temperature, using an easily recoverable plasticizer; and/or reducing the viscosity for extrusion of a high melt-viscosity polymer having a defined constitution, with the easily recoverable plasticizer, thereby increasing throughput and/or saving energy by lowering the extrusion temperature; and/or making articles with reduced discoloration and improved mechanical properties from such polymers; and/or making products not typically possible with such polymers, when alternative routes, such as solution processing are used.

For example, a method of making a polymer can comprise mixing a polymer as described herein with solid carbon dioxide to cool the polymer, plasticizing and extruding the mixture of polymer and solid carbon dioxide with a vented screw extruder, venting the carbon dioxide as a gas just before the die, passing the melt after the vent, which is generally believed to be essentially free of carbon dioxide, through a die, for example to make strands, film, sheet, filaments, or profiles.

In an embodiment, the polymer and solid $CO_2$ can be in powder form or can be in pellet form. For example, the polymer can be a powder and the solid $CO_2$ can be a powder; the polymer can be a powder and the solid $CO_2$ can be a pellet; the polymer can be a pellet and the solid $CO_2$ can be a powder; or the polymer can be a pellet and the solid $CO_2$ can be a pellet. The polymer and solid $CO_2$ can be mixed together to form a uniform mixture, using commonly available devices for blending powders or pellets. This process not only makes the blend uniform, it also cools the polymer. The mixed polymer (in either powder form or pellet form) and solid $CO_2$ (in either powder form or pellet form) can then be fed continuously to the hopper of a vented twin screw extruder, which discharges the mixture into the throat of the extruder. The polymer and $CO_2$ mixture can then be transported forward by the heated extruder to form a plasticized melt and the $CO_2$ is vented as a gas through a port located just before the die. The melt, which is essentially bubble-free can be pushed forward through a die to make the desired article such as strands for pelletization, film, sheet, filaments, tubes, or profiles. The extrudate emerging from the die can also be used to feed an injection molding machine.

In an extruder where a masterbatch dosing unit is present, polymer in powder or pellet form can be fed continuously to the hopper of a vented twin screw extruder, which discharges the polymer powder or pellet into the throat of the extruder. Typically such a dosing unit introduces polymer pellets containing additives (e.g., colored pigments) into the melt in the extruder. When $CO_2$ pellets are introduced into the extruder through the masterbatch dosing unit, they can be transported forward by the heated extruder, to form a plasticized melt. The masterbatch dosing unit generally feeds the $CO_2$ pellets into the extruder a little further down from the extruder throat and the $CO_2$ can be vented as a gas through a port located just before the die. The melt, which is essentially bubble free can be pushed forward through a suitable die to make the desired article such as strands for pelletization, film, sheet, filaments, tubes, or profiles. The extrudate emerging from the die can also be used to feed an injection molding machine.

Pellets made using the previously described processes can subsequently be re-processed (e.g., secondary processing). For example, in secondary extrusion, polymer pellets processed with solid $CO_2$ as described herein can be injection molded for filament spinning, film or sheet casting, and pipe and profile extrusion, without introducing solid $CO_2$. A single or twin screw extruder can be used for the secondary extrusion.

It is to be understood that precautionary measures and other embellishments can be added to the methods disclosed herein. For example, if a moisture sensitive polymer is to be extruded, the polymer can be dried and then the solid $CO_2$ can be mixed with the dry polymers in a moisture free environment (i.e., to avoid condensation), and then the mixture can be introduced into the hopper.

Generally, high molecular weight polymers do not dissolve in carbon dioxide ($CO_2$). Instead $CO_2$ dissolves in molten polymers, generally in an amount of 2% to 10% by weight (wt. %). This reduces the chain entanglement density and increases the free volume of the polymer and also causes a decrease in the Tg of the polymer, which in turn decreases the melt viscosity of the polymer. The $CO_2$ molecule has a pair of polarized carbon-oxygen double bonds (C=O bonds), but due to the symmetry of a pair of opposite dipoles, the molecule as a whole does not have a permanent dipole moment. However, due to the polarized bonds, dipole interactions can occur with other molecules having polarized bonds. Dipole interactions between the $CO_2$ and the polarized bonds in the polymer can be a mechanism for increased solubility. Not to be limited by theory, it is believed that $CO_2$ can be highly effective to reduce the viscosity of polymers with polarized groups, and those with aromatic rings. Another mechanism for increased solubility can be a Lewis acid-base interaction between the $CO_2$ and the polymer. Without being bound by any theory, it is believed that $CO_2$ can plasticize polymers such as PPO, PAN, polycarbonate, PTFE, polyamide, polyester, polyvinyl chloride (PVC), polystyrene, and combinations comprising at least one of the foregoing. Using solid carbon dioxide can reduce processing temperatures (e.g., extrusion temperatures), which can also reduce energy consumption. Alternatively, a faster throughput with extrusion (i.e., shorter residence time) can be achieved by lowering the viscosity of the polymer with the use of solid carbon dioxide instead of lowering the processing temperature.

It can be desired to introduce $CO_2$ into the polymer in a less complex and more beneficial way, which does not involve complicated pre-soaking and/or which does not require specially built extruders and equipment to handle super critical $CO_2$.

A method of introducing $CO_2$ into a polymer which does not involve pre-soaking and does not require specially built extruders and/or equipment is disclosed and described herein. The method can include powdering dry ice and mixing it with a polymer powder (e.g., PPO, PAN, PVC, etc.) to form a dry blend, which can be directly introduced to the hopper of a twin screw extruder. The polymer can then be melted and plasticized with $CO_2$ and gaseous $CO_2$ can be vented out before the die exit. Powdered $CO_2$ offers an advantage over $CO_2$ rods because powdered $CO_2$ can be intimately mixed and cooled with the polymer powder as described in further detail below. A further benefit of the methods disclosed herein is that the thermal load on heat sensitive polymers, such as PPO, PAN, and PVC, can be reduced. Since the dry ice is cold (it sublimes at −78° C.) at the time it goes into the hopper with the polymer powder, it cools the polymer as it sublimes. The polymer is heated along the barrel, but with this method using dry ice, the amount of time it spends at a high temperature is less compared with a system where the $CO_2$ is introduced as a gas at, for example 35° C. to a heated polymer. Moreover, dry ice (solid $CO_2$) is easier to handle than $CO_2$ from gas cylinders since dry ice is a compacted form compared with a gas and it is easier to transport, convey, and handle. It was surprisingly discovered that only a minimal amount of back venting or escape of the $CO_2$ from the hopper end occurred, and it was not enough to make the process inoperable. This is surprising because it can generally be expected that by introducing the $CO_2$ in an open hopper, there would be back-venting and escape of the $CO_2$ from the hopper end.

To avoid foaming of the extrudate, a vented screw extruder can be used as illustrated in FIG. 1. For example, in FIG. 1, the venting of the $CO_2$ is accomplished before the melt emerges from the die as seen by vent 20.

The extrudates made from solid $CO_2$ plasticized extrusion with venting also show unexpected improvement in mechanical and/or thermal properties. For example, an unexpected large improvement in ductility of injection molded articles from neat PPO can be observed with the method disclosed herein. Furthermore, it was surprising to discover that an increase in ductility was present even though the injection molding was done without $CO_2$, using PPO pellets which were made in the first pass by extrusion of PPO powder and dry ice powder. In other words, surprisingly the initial treatment with solid $CO_2$ can impart an unexpected beneficial effect on the pellets of PPO used for subsequent processing (e.g., injection molding). For example, an eightfold increase in the elongation at break of the polymer can be attained along with a threefold increase in the notched Izod impact strength of PPO processed using the methods disclosed herein with dry ice, compared with articles made from neat PPO pellets processed without dry ice. Further, both of the factors (i.e., elongation at break and notched Izod impact strength) illustrate a greatly increased ductility of PPO articles made using the processes disclosed herein, compared also with samples where $CO_2$ acting as a plasticizer is introduced directly as a gas into the extruder (instead of as a solid). Not to be limited by theory, it is believed that the dry ice polymer processing methods disclosed herein can lead to cooling of the polymer initially, which has a beneficial effect on the mechanical properties of the polymer.

Figure 13:
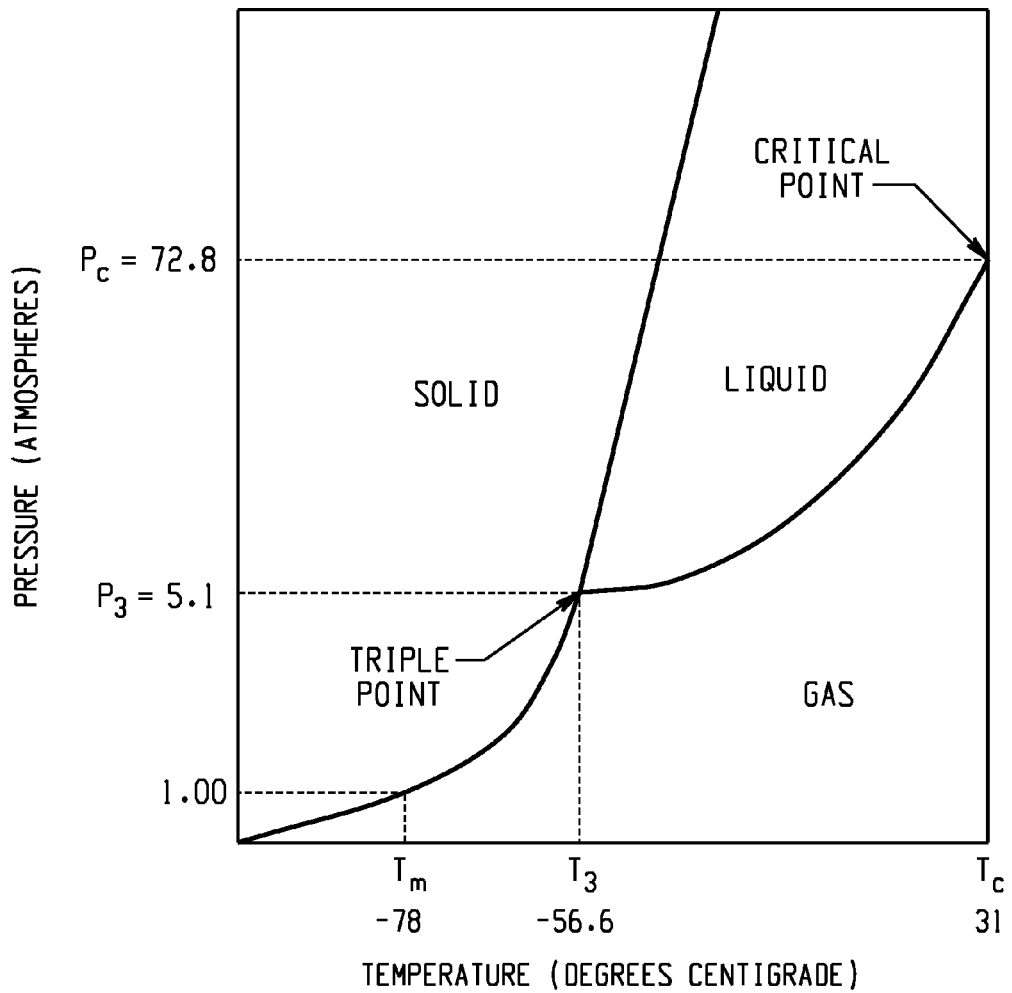
FIG. 13 is a graphical illustration of the phase diagram of carbon dioxide.

The phase diagram of $CO_2$ illustrated in FIG. 13 shows that if the temperature is kept low while the pressure is increased, the $CO_2$ would liquefy. Solid carbon dioxide is denser than liquid carbon dioxide. The triple point for carbon dioxide occurs at 5.1 atmospheres (atm) and −56.6° C. and the critical point occurs at 72.8 atm and 31° C. At a pressure of 1 atm, solid carbon dioxide sublimes at −78° C. No liquid phase occurs under normal atmospheric conditions. Because of the use of dry ice, the polymer powder and powdered $CO_2$ are very cold in the hopper, and as they move into the compression zone of the screw, the pressure increases, which can cause the $CO_2$ to liquefy initially leading to a slurry of polymer powder in liquid $CO_2$. This can allow a better impregnation of the $CO_2$ into the polymer powder by capillary attraction, for instance into a porous powder such as PAN or PVC.

The effects observed with the present method of adding dry ice as a powder to the extruder (e.g., at the hopper or at the throat of the extruder) with a polymer such as neat PPO can be superior to those observed with extrusion of neat PPO without plasticizer, and also with processes where the $CO_2$ is introduced to the polymer directly as a gas. Polymers made with the method disclosed herein, wherein dry ice is added to the hopper of an extruder along with a polymer in powder form, can have a positive impact on mechanical properties of the polymer. For example, an eightfold increase in the elongation at break and a threefold increase in the unnotched Izod impact strength, along with an increase in the stress at break, and no adverse effect on modulus and the stress at yield can be observed. For example, PPO powder processed with dry ice by the method disclosed herein can have an increase in elongation at break from 10% for neat PPO processed without solid $CO_2$ to 82% for neat PPO processed with solid $CO_2$ and an increase in unnotched Izod impact strength from 55 kiloJoules per square meter ($kJ/m^2$) for neat PPO processed without solid $CO_2$ to 185 $kJ/m^2$ for neat PPO processed with solid $CO_2$. Additionally, heat aging performance after 14 days at 90° C. for PPO extruded with dry ice can have good retention of ductility. For example, PPO articles extruded with dry ice can retain greater than or equal to 50% of the original value.

PPO can generally be used for injection molded articles, and as described in further detail below, it can be blended with polystyrene and/or polyamides to make it melt processable, and prevent brittle products from being made. Generally, neat PPO cannot be processed (e.g., via extrusion and/or injection molding) without being blended with another polymer because it will form a solid, unextrudable block in the processing equipment. The dry ice assisted process for pelletization of PPO can give desirable injection molded articles in terms of color tone, impact properties and heat resistance. For example, neat PPO pellets that were made using powdered dry ice in an extruder can be subsequently processed (e.g., extruded, injection molded, etc.) without further dry ice treatment. In other words, neat PPO can be processed in an extruder with powdered dry ice to form PPO pellets. These neat PPO pellets can then be re-processed (e.g., extruded, injection molded, etc.) without the use of dry ice for example, to form an article. It is to be understood that neat PPO generally refers to PPO containing a combined total of less than 15 wt. % of other polymers such as polystyrene, polyester, polyimide, polyamide, polypropylene that can be added to improve processability, specifically, less than 10 wt. %, more specifically, less than 7.5 wt. %, and even more specifically, less than 5 wt. %. It is further understood that the neat PPO can contain other additives such as stabilizers, mold release agents, processing aids, flame retardants, drip retardants, nucleating agents, ultraviolet blockers, dyes, pigments, antioxidants, anti-static agents, blowing agents, mineral oil, metal deactivators, antiblocking agents, nanoclays, electrically conductive agents, and combinations thereof.

Due to the poor stability of PPO in the melt, an extruder melt spinning process for fibers is difficult to run sustainably with this polymer. While for injection molded articles, PPO can be blended with polystyrene to lower the melt processing temperature, this approach cannot be done for fibers because the presence of polystyrene automatically reduces the drawability of the fibers. Previously, the spinning of pure poly(2,6-diphenyl-1,4-phenylene ether) fibers was accomplished from solution (wet spinning) and was followed by hot drawing the fibers, where after a further thermal treatment, some crystallinity could be induced so that the drawn fibers became solvent resistant. But the dry ice process described herein can allow for melt spinning of neat PPO fibers due to the enhanced thermal stability and the reduced viscosity. Moreover, despite the fact that the $CO_2$ is removed during venting before the die, a reduction in melt viscosity is observed. Further, due to the enhanced ductility of the extrudate, the hot drawability of the fibers is improved. Further still, the dry ice process disclosed herein to form polymers can also make it feasible to extrude rods, pipes, tubes, and profiles from neat PPO, neat PAN, PVC, and other polymers that can be difficult or even impossible to extrude.

The term "polyacrylonitrile polymers" (PAN polymers) as used herein generally refers to homopolymer and copolymers (e.g., polyacrylonitrile with less than or equal to 10 wt. % comonomer) of polyacrylonitrile. Neat (i.e., pure) PAN generally refers to PAN containing less than or equal to 10 wt. % comonomer, specifically, less than or equal to 7.5 wt. % comonomer, and more specifically, less than or equal to 5.0 wt. % comonomer. Hitherto, polyacrylonitrile polymers could not be melt spun because the melt viscosity was too high due to interchain nitrile dipole pairings and thermal degradation at the extrusion temperature, leading to exothermic crosslinking and cyclization reactions, which made the viscosity essentially infinite. Hence, industrial processes used wet spinning where 10% to 15% of the polymer is dissolved in an organic solvent (e.g., dimethyl sulphoxide) or aqueous inorganic salt solution (e.g., sodium thiocyanate (NaSCN) (aqueous)). After stretching, the PAN filaments can generally have a diameter of 10 to 15 micrometers, which can be carbonized to yield fibers having a diameter of 6 to 8 micrometers. The main disadvantages with this method are the cost of dissolution, the low solids content, the harmful solvent, the coagulation bath and the separation, and recovery of the solvent from the coagulant. Organic plasticizers have been proposed (e.g., propylene carbonate, ethylene glycol, and glycerol) for pseudo melt spinning which use higher solids content (generally 50% solids), but still the plasticizer is difficult to remove because it is a high boiling solvent that has to be recovered.

Moreover, the solution extrusion process does not allow the possibility of making profiles (rods, tubes, etc.) with thick dimensions (e.g., rods having a diameter of 10 millimeters (mm), and sheets having a thickness of 5 mm, etc.). The methods disclosed herein using solid carbon dioxide can allow such products to be made, for example, from PAN, which cannot be done with the a solution extrusion process. Although it can be possible for neat PAN to be extruded into profiles without solvent or plasticizer, it must be done at very low extrusion speeds in order to prevent degradation. The dry ice processes disclosed herein can reduce the melt viscosity and allow faster extrusion of thick profiles.

The dry ice processes can be suitable for non-crystalline polymers having polar groups and/or aromatic rings (e.g., benzene rings), as it is believed that the $CO_2$ can penetrate amorphous polymers with a lower packing density more easily This can include polymers that are inherently non-crystallizable, for example, polymethyl methacrylate. It can also include polymers that may be crystallizable but crystallize so slowly that for practical purposes they are amorphous. This category can include polymers such as polycarbonate and PPO. It can also include polyethylene terephthalate (PET), which can be obtained in an amorphous or a semi-crystalline state. It can further include a polymer such as PAN, which has an intermediate type of order, between amorphous and crystalline with the peculiar long range order in PAN being called 'laterally-ordered', hexagonal mesophase, nematic-like mesophase, and condiscrystal. The dry ice method may not be advantageous for highly crystallizable and fast crystallizing polymers such as PE and PP, which do not have polar groups.

As mentioned, solid carbon dioxide (solid $CO_2$, i.e., dry ice) can be used to improve the processability of a polymer. For example, the use of solid carbon dioxide in polymer processing (e.g., during extrusion) can allow for lower processing temperatures, which can reduce the overall energy consumption of the process, and thus, increase productivity. For example, using solid carbon dioxide when processing polyphenylene ether (e.g., polyphenylene oxide, PPO*, commercially available from SABIC Innovative Plastics) can allow processing at temperatures of 225° C. to 275° C., compared to 290° C. to 330° C. without the use of solid carbon dioxide, while using solid carbon dioxide when processing high temperature polycarbonate can allow processing temperatures of 275° C., compared to 300° C. without the use of solid carbon dioxide. Processing polymers at higher temperatures, e.g., greater than or equal to 45° C. to 55° C. higher than the glass transition temperature of the polymer, can lead to lower mechanical properties (e.g., tensile strength, modulus, ductility, etc.), as well as increased yellowness index, decreased heat aging performance, and higher internal stress, which can lead to cracking when molded into articles. As mentioned, the use of solid carbon dioxide can decrease processing temperatures, which can lead to higher mechanical properties, a decreased yellowness index, increased heat aging performance, and less internal stress.

The use of solid carbon dioxide in the methods and compositions disclosed herein can offer many benefits such as low toxicity and flammability. In addition, the low cost of solid carbon dioxide can make it a cost effective and environmentally friendly alternative. Additionally, polymers can be processed at lower temperatures, which can make it easier to process thermally sensitive polymers, and can improve dispersion of fillers and/or nanofillers in the compositions. Furthermore, the torque needed for the screw to turn and extrude the compositions can also be reduced, which allows for energy consumption savings when processing with solid carbon dioxide. While not wishing to be limited by theory, it is believe that solid carbon dioxide cools the polymer initially and then acts as a plasticizer to reduce its glass transition temperature, thus allowing extrusion at lower temperatures; alternatively, if the temperature is kept constant, the $CO_2$ reduces the viscosity, which can allow for higher throughput.

Polyphenylene ether resins (PPE; e.g., polyphenylene oxide, PPO*, commercially available from SABIC Innovative Plastics) are an extremely useful class of high performance engineering thermoplastics by reason of their hydrolytic stability, high dimensional stability, toughness, heat resistance and dielectric properties. They also exhibit high glass transition temperature values, generally in the range of 150° to 210° C., and good mechanical performance. This unique combination of properties renders polyphenylene ether based formulations suitable for a broad range of applications. An example is injection molded products which are used for high heat applications. Polyphenylene ether polymers typically have relatively high molecular weights and possess high melt viscosity with intrinsic viscosity values typically greater than about 0.4 deciLiters/gram (dL/g) as measured in chloroform at 25° C.

One area in which polyphenylene ether based compositions can improve is in melt flow capability, i.e. the ability to flow freely at elevated temperatures during various processing stages such as extrusion and molding. Poor melt flow can impact the size and type of the part which can be prepared with the composition and can also influence the type of equipment in which the composition is processed. Processability can be improved by decreasing the molecular weight of the polyphenylene ether polymers; however, a lower molecular weight can adversely affect other properties, such as impact strength. To aid processing, polyphenylene ether resins can be prepared with flow promoters, such as polystyrene, saturated polyalicyclic resins and terpene phenol, and other such flow promoters to reduce viscosity and impart high flow to the resulting composition. Polystyrene, terpene phenol, and other such flow promoters however reduce the heat deflection temperature (HDT) of the product and typically increase the flammability of the polyphenylene ether resin, as measured under the Underwriters Laboratory UL94 standard protocol. Therefore, it can be desirable to provide a polyphenylene ether resin formulation with high flow characteristics with reduced loadings of flow modifier to minimize the impact on HDT values, impact properties, and flame retardance.

Poly(arylene ether)s (e.g., polyphenylene ether (PPE); polyphenylene oxide (PPO*)) include those comprising repeating structural units having the formula (1)

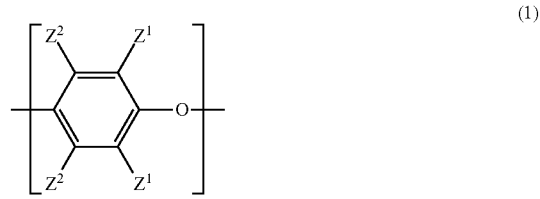

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(arylene ether) has an intrinsic viscosity of 0.3 to 0.55 deciliters per gram measured at 25° C. in chloroform. Specifically, the poly(arylene ether) intrinsic viscosity can be 0.35 to 0.5 deciliters per gram (dL/g), more specifically 0.35 to 0.46 deciliters per gram.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). In some embodiments, the poly(arylene ether) comprises a poly(2,6-dimethyl-1,4-phenylene ether) having an intrinsic viscosity of about 0.35 to about 0.5 deciliters per gram, specifically about 0.35 to about 0.46 deciliters per gram, measured at 25° C. in chloroform.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product are present. The poly(arylene ether) can be in the form of a homopolymer, a copolymer, a graft copolymer, an ionomer, or a block copolymer, as well as combinations comprising at least one of the foregoing.

An advantage of using solid carbon dioxide during processing is that the polymer composition can comprise polyphenylene ether can contain a combined total of less than 15 wt. % of an additional polymer having a lower glass transition temperature such as polystyrene or nylon (e.g., polyamide) that can be added to improve processability. In such a case, the polymer can comprise 85 wt. % of polyphenylene ether, based on the total weight of the composition.

Polyamides, also known as nylons, are characterized by the presence of a plurality of amide (—C(O)NH—) groups and are described in U.S. Pat. No. 4,970,272 to Gallucci. Suitable polyamides include polyamide-6, polyamide 6,6, polyamide-4, polyamide-4,6, polyamide-12, polyamide 6,10, polyamide 6,9, polyamide-6,12, amorphous polyamides, polyamide 6/6T and polyamide 6,6/6T with triamine contents below 0.5 weight percent, polyamide 9T, and combinations thereof. In some embodiments, the polyamide comprises a polyamide 6,6. In some embodiments, the polyamide comprises a polyamide 6 and a polyamide 6,6. In some embodiments, the polyamide or combination of polyamides has a melting point (Tm) greater than or equal to 171° C. When the polyamide comprises a super tough polyamide, that is, a rubber-toughened polyamide, the composition may or may not contain a separate impact modifier.

Polyamides can be obtained by a number of processes such as those described in U.S. Pat. Nos. 2,071,250, 2,071, 251, 2,130,523, and 2,130,948 to Carothers; U.S. Pat. Nos. 2,241,322 and 2,312,966 to Hanford; and U.S. Pat. No. 2,512,606 to Bolton et al. Polyamides are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent solution in 96 weight percent sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt. % solution in 96 wt. % sulfuric acid.

In some embodiments, the polyamide comprises a polyamide having an amine end group concentration greater than or equal to 35 microequivalents amine end group per gram of polyamide ($m_{eq}/g$) as determined by titration with HCl. The amine end group concentration can be greater than or equal to 40 $m_{eq}/g$, or, more specifically, greater than or equal to 45 $m_{eq}/g$. Amine end group content can be determined by dissolving the polyamide in a suitable solvent, optionally with heat. The polyamide solution is titrated with 0.01 normal hydrochloric acid (HCl) solution using a suitable indication method. The amount of amine end groups is calculated based on the volume of HCl solution added to the sample, the volume of HCl used for the blank, the molarity of the HCl solution, and the weight of the polyamide sample.

When present, polyphenylene ether polymer composition comprises the polyamide in an amount of less than 15 wt. %, based on the total weight of the composition, specifically, less than 10 wt. %, more specifically, less than 7.5 wt. %, and even more specifically, less than 5.0 wt. %. Within this range, the polyamide amount can be 10 wt. % to 15 wt. %, specifically 5.0 wt. % to 7.0 wt. %. In some embodiments, the poly(arylene ether) and the polyamide can be used in a weight ratio of about 0.5:1 to about 1.2:1, specifically about 0.8:1 to about 1.2:1, more specifically about 1:1 to about 1.2:1.

In some embodiments, a compatibilizing agent can be used to facilitate formation of a compatibilized blend of the polyamide and the polyphenylene ether. As used herein, the term "compatibilizing agent" refers to a polyfunctional compound that interacts with the polyphenylene ether, the polyamide, or both. This interaction can be chemical (for example, grafting) and/or physical (for example, affecting the surface characteristics of the dispersed phases). In either instance the resulting polyamide-polyphenylene ether blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that can be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. No. 5,132,365 to Gallucci, and U.S. Pat. Nos. 6,593,411 and 7,226,963 to Koevoets et al.

The foregoing compatibilizing agents can be added directly to the melt blend or pre-reacted with either or both of the polyphenylene ether and the polyamide, as well as with any other resinous materials employed in the preparation of the composition. It is believed that such pre-reacting may cause the compatibilizing agent to react with and consequently functionalize the polyphenylene ether. For example, the polyphenylene ether can be pre-reacted with maleic anhydride to form an anhydride-functionalized polyphenylene ether that has improved compatibility with the polyamide compared to a non-functionalized polyphenylene ether.

When a compatibilizing agent is employed in the preparation of the compatibilized polyamide-polyphenylene ether composition, the amount used will be dependent upon the specific compatibilizing agent chosen and the specific polymeric system to which it is added. In some embodiments, the compatibilizing agent amount is about 0.1 to about 1 wt. %, specifically about 0.2 to about 0.8 wt. %, more specifically about 0.3 to about 0.6 wt. %, based on the total weight of the polymer composition.

In addition to the polyphenylene ether and optional polyamide, the polyphenylene ether polymer composition can comprise glass fibers. Exemplary glass fibers include those based on E, A, C, ECR, R, S, D, and NE glasses, as well as quartz. The glass fiber can have a diameter of about 2 to about 30 micrometers, specifically about 5 to about 25 micrometers, more specifically about 10 to about 15 micrometers. The length of the glass fibers before compounding can be about 2 to about 7 millimeters, specifically about 3 to about 5 millimeters. The composition can comprise the glass fibers in an amount of 5 wt. % to 15 wt. %, specifically 7 wt. % to 13 wt. %, more specifically 9 wt. % to 11 wt. %, based on the total weight of the polymer composition.

The polyphenylene ether composition can, optionally, further include an impact modifier. Impact modifiers can be block copolymers containing alkenyl aromatic repeating units, for example, A-B diblock copolymers and A-B-A triblock copolymers having one or two alkenyl aromatic blocks A (blocks having alkenyl aromatic repeating units), which are typically styrene blocks, and a rubber block, B, which is typically an isoprene or butadiene block. The butadiene block can be partially or completely hydrogenated. Mixtures of these diblock and triblock copolymers can also be used as well as mixtures of non-hydrogenated copolymers, partially hydrogenated copolymers, fully hydrogenated copolymers and combinations of two or more of the foregoing. A-B and A-B-A copolymers include, but are not limited to, polystyrene-polybutadiene, polystyrene-poly(ethylene-propylene) (SEP), polystyrene-polyisoprene, poly(α-methylstyrene)-polybutadiene, polystyrene-polybutadiene-polystyrene (SBS), polystyrene-poly(ethylene-butylene)-polystyrene (SEBS), polystyrene-poly(ethylene-propylene)-polystyrene, polystyrene-polyisoprene-polystyrene (SIS), poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. In one embodiment, the impact modifier comprises polystyrene-poly(ethylene-butylene)-polystyrene, polystyrene-poly(ethylene-propylene), or a combination comprising at least one of the foregoing.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 wt. %, or, more specifically, less than 3 wt. %, or, even more specifically less than 2 wt. %, based on the total weight of the block copolymer. Exemplary impact modifiers are commercially available from a variety of sources including DuPont* under the trademarks ELVALOY PTW*, SURLYN*, and FUSABOND*.

The impact modifiers can be used singly or in combination. When present, the impact modifier can be used in an amount of 1 wt. % to 15 wt. %, based on the total weight of the polymer composition. Within this range, the impact modifier can be present in an amount of 1.5 wt. % to 13 wt. %, specifically 2 wt. % to 12 wt. %, more specifically 4 wt. % to 10 wt. %. In some embodiments, the polymer composition can comprises less than or equal to 1 wt. %, specifically less than or equal to 0.5 wt. %, more specifically less than or equal to 0.1 wt. %, of any impact modifiers. In some embodiments, the thermoplastic composition excludes impact modifiers.

In some embodiments, the polyphenylene ether composition comprises less than or equal to 0.5 wt. %, specifically less than or equal to 0.1 wt. %, of an unhydrogenated or hydrogenated block copolymer of an alkenyl aromatic compound and a conjugated diene. In this context, the weight percent upper limits represent the sum of unhydrogenated and hydrogenated block copolymer. In some embodiments, the thermoplastic composition excludes unhydrogenated and hydrogenated block copolymers of an alkenyl aromatic compound and a conjugated diene.

In some embodiments, the polyphenylene ether composition comprises less than 15 wt. %, specifically less than 5 wt. %, more specifically less than or equal to 3 wt. %, still more specifically less than 1 wt. %, and more specifically still, less than 0.2 wt. % of homopolystyrene. In some embodiments, the thermoplastic composition excludes homopolystyrene. In some embodiments, the thermoplastic composition comprises less than 5 wt. %, specifically less than 3 wt. %, more specifically less than 1 wt. %, of a rubber-modified polystyrene. In some embodiments, the thermoplastic composition excludes rubber-modified polystyrene.

In some embodiments, the polyphenylene ether composition comprises less than 15 wt. %, specifically less than 3 wt. %, more specifically less than 1 wt. %, more specifically less than 0.2 wt. %, of any polymer other than, polyphenylene ether and any additives previously discussed.

The polyphenylene ether composition can comprise a reinforcing filler. Exemplary mineral fillers include inorganic fillers that have an average particle size of 5 millimeters or less and an aspect ratio of 3 or more. Such mineral fillers include talc, kaolinite, micas (e.g., sericite, muscovite and phlogopite), chlorite, montmorillonite, smectite and halloysite. The reinforcing filler can be present in the composition in amounts of 5 wt. % to 50 wt. % based on the total weight of the composition. Within this range an amount of reinforcing filler of less than or equal to 45 wt. % can be employed, or, more specifically, less than or equal to 40 wt. %, or, even more specifically, less than or equal to 35 wt. %. Also within this range is an amount of reinforcing filler of greater than or equal to 10 wt. %, or, more specifically, greater than or equal to 15 wt. %, or, even more specifically, greater than or equal to 20 wt. %.

The polyphenylene ether polymer composition can, optionally, further include one or more additives. Additives include, for example, stabilizers, mold release agents, processing aids, polyamide flow promoters (for example, low molecular weight polyolefins with or without epoxy functionality, low molecular weight ethylene-propylene rubbers, low molecular weight thermoplastic polyesters, and liquid polyolefin rubbers), poly(arylene ether) flow promoters (for example, low molecular weight homopolystyrenes, and low molecular weight rubber-modified polystyrenes), flame retardants, drip retardants, nucleating agents, UV blockers, dyes, pigments, antioxidants, anti-static agents, blowing agents, mineral oil, metal deactivators, antiblocking agents, nanoclays, electrically conductive agents, and combinations thereof. Effective amounts of the additives vary widely, but they are usually present in an amount of less than or equal to 50 wt. %, based on the total weight of the composition. Amounts of these additives are generally 0.25 wt. % to 2 wt. %, based upon the total weight of the composition. The effective amount can be determined by those skilled in the art without undue experimentation.

Aromatic polycarbonate compositions can be subject to heat degradation manifested by a high yellowness index. "High heat polycarbonate", e.g., polycarbonate comprising 2-phenyl-3,3-bis(4-hydroxyphenyl) phthalimidine (i.e., p,p-PPPBP carbonate units) can be prone to a high yellowness index. p,p-PPPBP polycarbonate processed with solid carbon dioxide can have improved long term heat aging resistance and a reduced yellowness index as compared to a p,p-PPPBP polycarbonate produced without the use of solid carbon dioxide. Although not wishing to be limited by theory, it is believed that during extrusion, solid carbon dioxide serves initially as a coolant and then as a plasticizer and helps to dilute the chain entanglement of the polycarbonate in the melt, which increases chain mobility and decreases the viscosity of the polycarbonate, which in turn aids in decreasing the degradation of the polycarbonate. If the polycarbonate composition comprises a stabilizer package, including components such as antioxidants, thermal stabilizers, metal deactivators, quenchers, epoxies, etc., and combinations comprising at least one of the foregoing, the use of solid carbon dioxide during processing can further improve the reduction in yellowness index and the long term heat aging resistance, in addition to other properties.

As used herein, the term "polycarbonate" means compositions having repeating structural carbonate units of formula (2)

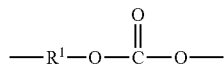
(2)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

$$HO-A^1-Y^1-A^2-OH \quad (3)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (4)

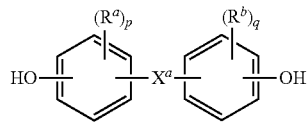
(4)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (4), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (5)

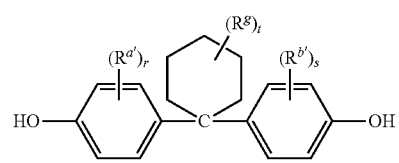
(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, can be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (6)

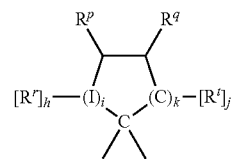
(6)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (7)

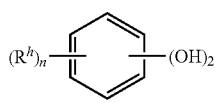

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

A specific example of dihydroxy compounds of formula (2) can be the following formula (8):

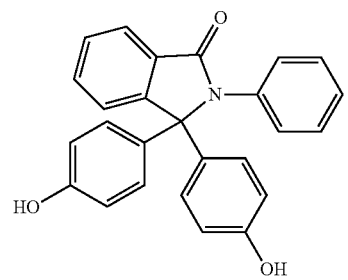

(also known as 3,3-bis(4-hydroxyphenyl)-2-phenylisoindolin-1-one (PPPBP)) also known as 2-phenyl-3,3-bis(4-hydroxyphenyl)phthalimidine.

The dihydroxy compounds of formula (2) can also be the following formula (9):

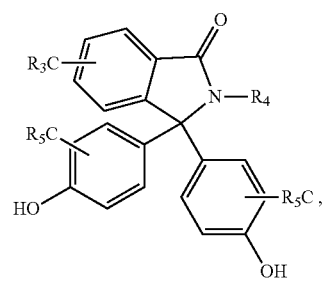

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

In an embodiment, the polycarbonate can comprise a copolymer of p,p-PPPBP carbonate as described with respect to formulas (8) and (9) and BPA carbonate, where the copolymer has the structure illustrated in formula (10).

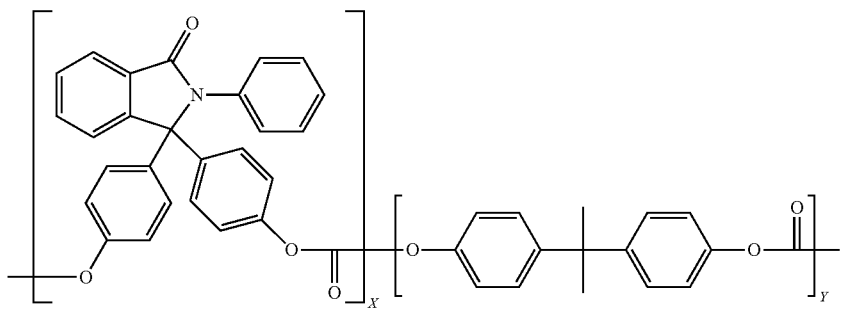

(10)

The copolymer of p,p-PPPBP carbonate and BPA carbonate can comprise 25 mol % to 75 mol % p,p-PPPBP carbonate and 75 mol % to 25 mol % BPA carbonate, specifically, 35 mol % p,p-PPPBP carbonate and 65 mol % BPA carbonate.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like. For example, the polycarbonate can comprise combinations of polycarbonate-polybutylene terephthalate (PBT), polycarbonate-polyetheylene terephthalate (PET), polycarbonate-poly(1,4-cyclohexyliedene cyclohexane-1,4-dicarboxylate (PCCD); polycarbonate-glycol modified polyethylene terephthalate (PETG), polycarbonate-glycol modified polycyclohexylene dimethylene terephthalate (PCTG), as well as other polyesters, The polycarbonate composition can further include impact modifier(s). Exemplary impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. Impact modifiers are generally present in amounts of 1 to 30 wt. %, based on the total weight of the polymers in the composition.

In addition to the polycarbonate, the composition can include various additives ordinarily incorporated into polymer compositions of this type, with the proviso that the additive(s) are selected so as to not significantly adversely affect the desired properties of the thermoplastic composition, in particular hydrothermal resistance, water vapor transmission resistance, puncture resistance, and thermal shrinkage. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt. %, based on the total weight of the composition.

PAN is another polymer that can benefit from processing with dry ice. PAN can be produced by several methods. One method to produce atactic PAN is by free radical polymerization of acrylonitrile. PAN can also be polymerized anionically, but the resulting polymer has very low molecular weight. A common free radical initiator is azoisobutyronitrile, which cleaves thermally and generates free radicals to initiate the polymerization of acrylonitrile. The polymerization can be performed in suspension or in solution. Bulk polymerization can be possible but is not generally practiced because the reaction is highly exothermic. Generally, polymers having an intrinsic viscosity of 1 dL/g to 15 dL/g can be used. The PAN produced by free radical polymerization is generally atactic with a very slight bias towards an isotactic content. The typical ratio of isotactic (mm), syndiotactic (rr) and heterotactic (mr) triads in PAN made by free radical polymerisation, found by carbon 13 nuclear magnetic resonance ($C^{13}$ NMR), is mm:rr:mr=28:22:50; for perfectly atactic, the ratios would be 25:25:50. The polymer can be obtained after washing and drying, which results in a white or off-white powder. Examination under a microscope shows a highly porous morphology similar to a head of cauliflower, which can absorb a very high content of liquid by capillarity. The melting point of PAN is about 320° C., but this is only observed at high heating rates where melting can be observed before degradation. Thermal analysis by Differential Scanning calorimetry (DSC) shows two Tgs at about 100° C. and about 150° C. and no melting peak when the polymer is heated at 10° C. per minute. At 330° C., a fiercely exothermic peak is seen, and this is due to concerted nitrile polymerization (i.e., cyclization and crosslinking of the nitriles), whereby the carbon-nitrogen triple bonds (C≡N) are converted to carbon-nitrogen double bonds (C=N). Only if a heating rate of greater than 40° C. per minute is used, an endothermic melting peak can be detected at 320° C. just before the exothermic peak at 330° C. Thus, at any practical heating rate, such as in an extrusion process, the crosslinking and cyclization reactions would overtake any melting and make the polymer infusible in the extruder.

Use of copolymers of PAN can be desirable when the required products are filaments. For example, comonomers in an amount of less than or equal to 15 wt. % can be added. Any vinyl comonomer can be added such as vinyl acetate, methacrylate, methacrylonitrile. Vinyl acetate, methacrylate, and methacrylonitrile can be used for textile fibers. For carbon fibers precursors, 1 wt. % to 2 wt. % of comonomer, such as itaconic acid, acrylic acid, and/or methacrylic acid can be used; these comonomers function to moderate the exotherm when the PAN is stabilized at temperatures of 220° C. to 280° C. as a prelude to carbonization. The dry ice assisted extrusion of PAN can be accomplished with both homopolymer and copolymers.

Generally, PAN homopolymer cannot be extruded using a screw extruder, with a fine die (e.g., for making fibers) or even with a strand pelletizing die. The viscosity is simply too high and raising the temperature under pressure even to 200° C. risks triggering the exothermic reaction. The safe thermoplastic operating regime for PAN in a piston extruder device is between 150° C. to 200° C., with 170° C. being an optimum extrusion temperature. The extrusion speed, however, is typically less than a few centimeters per minute (cm/min) (e.g., less than or equal to 10 cm/min). Any attempts at raising the extrusion speed by raising the piston speed can lead to an increase in extrusion pressure and blocking of the die.

Polyvinyl chloride (PVC) is another example of a polar vinyl polymer that degrades at extrusion temperatures. PVC can be plasticized with dioctyl phthalate (DOP) and other additives to reduce friction and thermal decomposition. This liquid plasticizer depresses the Tg, and as it cannot be removed easily, DOP plasticized extrusion can be used for flexible PVC products such as electrical wire insulation, hoses, tubes, and so forth. Rigid PVC products such as pipes, pipe fittings, profiles for windows and doors, and films are desirable but they generally cannot be formed using a liquid plasticizer as a processing aid, as it will remain in the article and depress the Tg. However, pure PVC (without plasticizer) cannot be extruded because it degrades, giving off highly corrosive HCl; the degradation residue (as found also with PPO and PAN) does not melt and can jam the screw extruder. Hence, rigid PVC products can be extruded only by using various additives. A typical rigid PVC extrusion formulation contains 1-3 parts per hundred (pph) of heat stabilizers. The heat stabilizers can comprise lead compounds (2-3 pph), calcium/zinc compounds (2-3 pph), tin compounds (1-2 pph), organic stabilizers (2 pph), and combinations comprising at least one of the foregoing. In addition to the heat stabilizers, an internal lubricant (0.5 to 1.0 pph), whose purpose is to reduce heat generation due to inter-powder particle friction, can be added. Yet another ingredient in the formulation is the external lubricant, whose purpose is to reduce the friction and sticking of the PVC melt to the metal walls of the screw-extruder barrel. Finally, to overcome the brittleness of rigid PVC made by such extrusion, typically 5 to 8 pph of impact modifiers are added.

The existing technology for extrusion of rigid PVC articles is undesirable, but has continued as there was no alternative. Rigid PVC pipes are an important element in the construction industry. But the internal and external lubricants and other ingredients in the formulation add to the processing cost, as these materials are not recoverable. Lead metal compounds can be an environmental hazard and there is also the concern of lead migration into water in PVC pipes.

In contrast, solid carbon dioxide plasticized extrusion to make rigid PVC articles can solve these problems, as the solid $CO_2$ initially reduces the interparticle PVC friction; the solid carbon dioxide acting as a plasticizer depresses the Tg (like DOP) and allows lower temperature extrusion, but unlike DOP, it can be removed. The cooling effect of the solid carbon dioxide reduces the high-temperature exposure time; and the solid carbon dioxide acting as a plasticizer does not disappear with the extruded article and can be fully recovered by the venting before the die exit. Thus, the extrudate that emerges has no $CO_2$ plasticizer and is a rigid PVC article.

FIG. 1 illustrates a vented extruder schematic design for processing the compositions disclosed herein. As illustrated in FIG. 1, polymer resin, for example, in powder form and dry ice can be inserted into the hopper 10, move down through the feed throat 18, and can be mixed by the various elements of the extruder screw 12. Six zones of the extruder screw are illustrated in FIG. 1 and labeled 1 to 6. Before entering the die, gaseous $CO_2$ is vented from the extruder system 16 through vent 20. The mixture can be extruded through a die 14 and extruded from the extruder system 16.

It is to be understood that any thermoplastic material can be processed using the methods disclosed herein. For example, the polymer can comprise polyphenylene ether-based resin, polyacetal-based resin, polyamide-based resin, polystyrene-based resin, polymethyl methacrylate based resin, polyacrylonitrile-based resin, polyester-based resin, polycarbonate, polyphenylene sulfide, polyetherimide, polyethersulfone, polysulfone, polyether (ether) ketone, polyolefin-based resin, polyethylene terephthalate based resin (PET), poly p phenylene based resin, polyvinyl chloride (PVC) based resin, polytetrafluoroethylene (PTFE) based resin and combinations comprising at least one of the foregoing.

The end product of dry ice plasticized extrusion depends on the die attached to the extruder after the venting port. If a spinneret die is used, filaments can be spun. If a film casting die is used, a film can be extruded. If a tube or other profile extrusion die is used, a pipe or other profile can be formed. If a strand die is used, the strands can be cooled underwater and then pelletized. The pelletized chips made by dry ice plasticized extrusion may be injection molded, i.e., re-processed advantageously with or without dry ice, as shown in the examples.

The method of making the compositions disclosed herein can comprise extruding a polymer and solid carbon dioxide and venting out the carbon dioxide as a gas before the die exit. The extrusion can take place at a temperature that is 0° C. to 80° C. above the glass transition temperature of the polymer, specifically, greater than or equal to 25° C. to 75° C. above the glass transition temperature of the polymer, more specifically, greater than or equal to 35° C. to 65° C. above the glass transition temperature of the polymer, and more specifically, greater than or equal to 45° C. to 55° C. above the glass transition temperature of the polymer. Alternatively, or in addition to processing within 50° C. of the glass transition temperature of the polymer, the extrusion can occur at a temperature that is lower than the degradation temperature of the polymer, for example, 0° C. to 50° C. lower than the degradation temperature of the polymer.

The method can also comprise introducing polymer and solid carbon dioxide at the throat of an extruder, venting gas from the extruder, and extruding the polymer. The polymer and solid carbon dioxide can be introduced to the hopper at the same time or can be introduced to the extruder separately. Once the polymer has been extruded, it can then be formed into fibers. It is to be understood that when referring to forming fibers, no breakage of the fibers is observed. In other words, the fibers can be formed without breaks in the fiber along the length of the fiber. In the melt spinning of filaments/fibers, the polymer can be melted and extruded through a spinneret consisting of a multitude of fine capillaries or holes. The filaments are often drawn in an air gap in the molten state by winding the fibers on a take-up bobbin faster than the filaments exit from the holes of the spinneret; at some distance down the threadline, the filaments solidify due to cooling. The as-spun filaments may be reheated and drawn to improve orientation and improve the mechanical properties.

In another method called wet spinning, a 10% to 15% polymer solution is extruded through a spinneret into a coagulating bath and the filament is generated by extracting the solvent into a liquid with which it is miscible. The filaments from wet spinning can also be heated and drawn to improve the mechanical properties. In general, if possible, melt spinning is more desirable. This is because wet spinning can be more expensive due to the cost of solvent extraction and recovery and is used only as a last resort with polymers whose melting point is near or above the degradation temperature. Neat PPO fibers are not melt spun due to the fact that the polymer degrades and blocks the spinneret, and a wet spinning process has not been commercialized because of the high cost of PPO and the economics of wet spinning combine to make neat PPO fibers unviable. In the case of PAN, a process based on wet spinning is viable and is industrially used, although a melt spinning process or a plasticized melt spinning process where plasticizer recovery is easy would be desirable if possible. The possibility of plasticized melt spinning of PPO and PAN fibers, with easy recovery of the plasticizer exists with solid $CO_2$ plasticized extrusion.

As described for rigid PVC, another type of product that would be of interest is rods, tubes, and profiles from polymers such as PPO and PAN. In the case of PVC, the industry has found additive packages consisting of thermal stabilizers and lubricants that allow the extrusion of profiles. However, melt extrusion of neat PPO and neat PAN is barely possible because of the high melt viscosity and the degradation tendency. With the method disclosed herein, the possibility for making rigid and massive articles such as rods, tubes, and pipes from neat PPO and PAN can be realized.

A method for processing a polymer whose degradation temperature overlaps with the melting temperature, e.g., polyphenylene ether powder, can comprise mixing the powder with solid carbon dioxide powder, and adding the powder mixture to the extruder at the hopper; plasticizing the mixture by the screw and transporting the mixture forward, and venting the carbon dioxide as a gas before the die exit. The polyphenylene ether melt, from which the carbon dioxide has been removed, can then be extruded through a die to form strands which are pelletized. The polyphenylene ether pellets can then subsequently be reprocessed by injection molding, without the use solid carbon dioxide to form the article, wherein the polyphenylene ether consists of less than 15 wt. % of a combined total of another polymer selected from the group consisting of polystyrene, polyester, polyimide, polyamide, polypropylene, and combinations comprising at least one of the foregoing. It is contemplated that other polymers, including, but not limited to polycarbonate, polyacrylonitrile, polytetrafluoroethylene, and combinations comprising at least one of the foregoing can be processed in a similar manner.

The following examples are merely illustrative of the compositions and methods disclosed herein and are not intended to limit the scope hereof.

EXAMPLES

All compositions for Examples 1, 2, and 3 were prepared by extrusion using a co-rotating twin-screw extruder with a length to diameter ratio (L/D) of 25:1. The barrel had 6 zones. The extruder had a vent located at Zone 5, before the die, such that the $CO_2$ could be removed as gas (see e.g., FIG. 1). The screw revolutions per minute (RPM) were maintained at 300. The PPO used in the examples did not contain any additional polymer such as polystyrene or polyamide to enhance processability.

Neat PPO powder, having an intrinsic viscosity of 0.46 dL/g, was processed using the temperature profiles set forth in Table 1 for Comparative Samples 1 and 2 (C1 and C2) and Samples 1 and 2. Barrel Zone 1 was the feed end. Table 2 lists the compositions for the samples in Table 1. Temperature was measured in degrees Celsius (° C.) and feed rate was measured in 10 kilograms per hour (kg/hr). In Samples 1 and 2, which contained 100 parts PPO and 50 parts solid $CO_2$, the solid $CO_2$ from a block of dry ice was grated and crushed into a free flowing powder form and mixed with the PPO powder manually and then fed into the hopper of the extruder. The extruder was equipped with a two-strand die having a diameter of 3.2 mm; the two molten strands were passed through a water bath to solidify them, and then fed to a pelletizing machine. Pellets were formed from compositions using the formulations and processing conditions listed in Tables 1 and 2.

TABLE 1

Temperatures for extrusion of PPO

| Sample No. | Process | Barrel Zone No. | | | | | | Die | Feed Rate (10 kg/hr) |
| --- | --- | --- | --- | --- | --- | --- | --- | --- | --- |
| | | 1 | 2 | 3 | 4 | 5 | 6 | | |
| | | Temperature (° C.) | | | | | | | |
| C1 and 1 | High Temperature | 200 | 270 | 275 | 285 | 285 | 285 | 300 | 10 |
| C2 and 2 | Low Temperature | 200 | 240 | 245 | 250 | 250 | 255 | 260 | 10 |

TABLE 2

Composition for PPO Samples

| | Sample No. | |
|---|---|---|
| | C1 and C2 | 1 and 2 |
| PPO (wt. %) | 100 | 100 |
| Solid $CO_2$ (wt. %) | 0 | 50 |
| Total | 100 | 150 |

C1, C2, Sample 1, and Sample 2 were compounded into pellets and the pellets were then pre-dried and molded using a 60 ton (T) L&D injection molding machine under the same molding conditions, which are listed in Table 3. The mold produced bars having a length of 170 mm, width of 10 mm, and height of 4.0 mm. The mold temperature was 100° C., screw speed was 75 revolutions per minute (rpm), injection pressure was 85 Bar (8.5 MegaPascals (MPa), cooling time was 10 seconds, back pressure was 5 Bar (0.5 MPa), and hold time was 2 seconds. No dry ice was used in the hopper of the extruder of the injection molding machine. Tensile testing was then conducted on the molded bars after the samples were conditioned for 48 hours at 23° C. and 50% relative humidity. The tensile testing was conducted on a Zwick 010 tensile machine with a pulling speed 1 of 1 millimeter per minute (mm/min) with up to 1% elongation, and a pulling speed 2 of 50 mm/min up to break.

TABLE 3

Injection Molding Processing Conditions

| Zone | Nozzle | 3 | 2 | 1 | Feed | Oil Temperature (° C.) |
|---|---|---|---|---|---|---|
| Temperature (° C.) | 330 | 325 | 300 | 285 | 60 | 40 |

As can be seen in Table 4, PPO samples containing solid $CO_2$ can be processed at lower torque ranges than PPO samples not containing solid $CO_2$ (i.e., Samples 1 and 2). For example, samples containing solid $CO_2$ can be processed at lower torque values of greater than or equal to 25%, specifically, greater than or equal to 30%, and even more specifically, greater than or equal to 33%, in a high temperature process and even up to 100% in a low temperature process. As illustrated in Table 4, PPO without solid $CO_2$ cannot be processed in the low temperature process (i.e., C1 and C2). These results demonstrate that PPO containing solid $CO_2$ can be processed at lower temperatures with less torque, which can help save energy with lower power consumption for heaters and the extruder motor drive. Additionally, there was no difference in the appearance of the pellets between C1 and C2 and Sample 1 and Sample 2.

TABLE 4

Torque Parameters

| Sample No. | |
|---|---|
| C1 | Torque (%) High Temperature Process 40-45 |
| C2 | Torque (%) Low Temperature Process Cannot extrude |
| 1 | Torque (%) High Temperature Process 30-35 |
| 2 | Torque (%) Low Temperature Process 30-38 |

Figure 2:
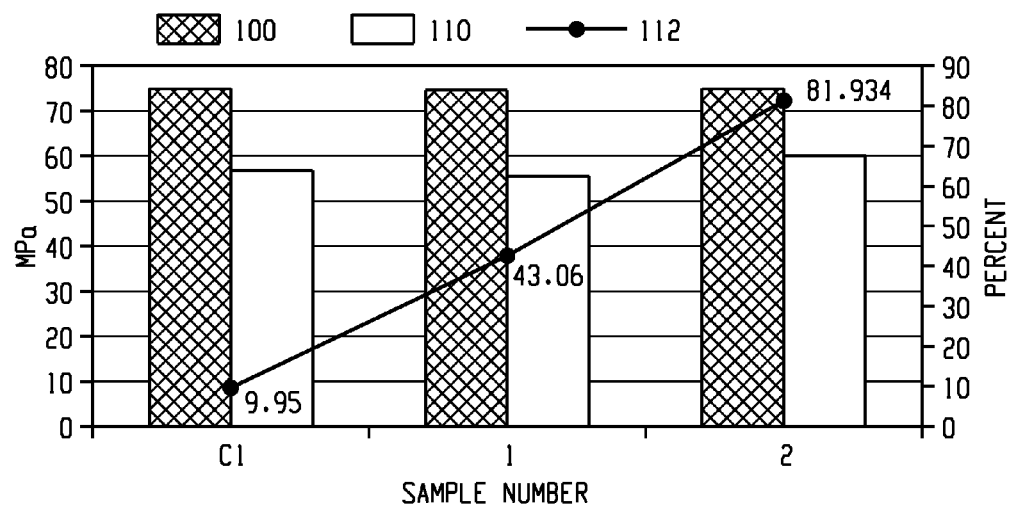
FIG. 2 is a graphical illustration of the stress at yield, and stress at break, of injection molded samples re-processed from PPO pellets made with and without the use of solid carbon dioxide.
Figure 3:
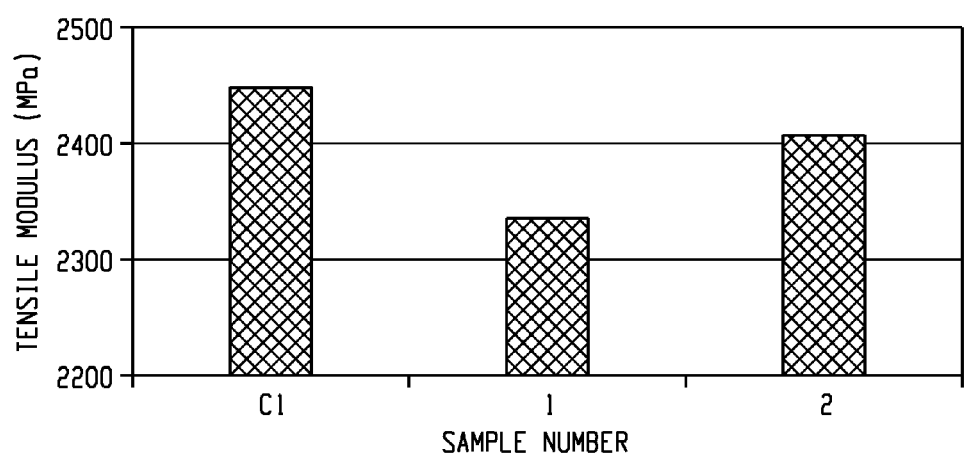
FIG. 3 is a graphical illustration of the tensile modulus of injection molded samples, re-processed at various temperatures from PPO pellets made with and without the use of solid carbon dioxide.
Figure 4:
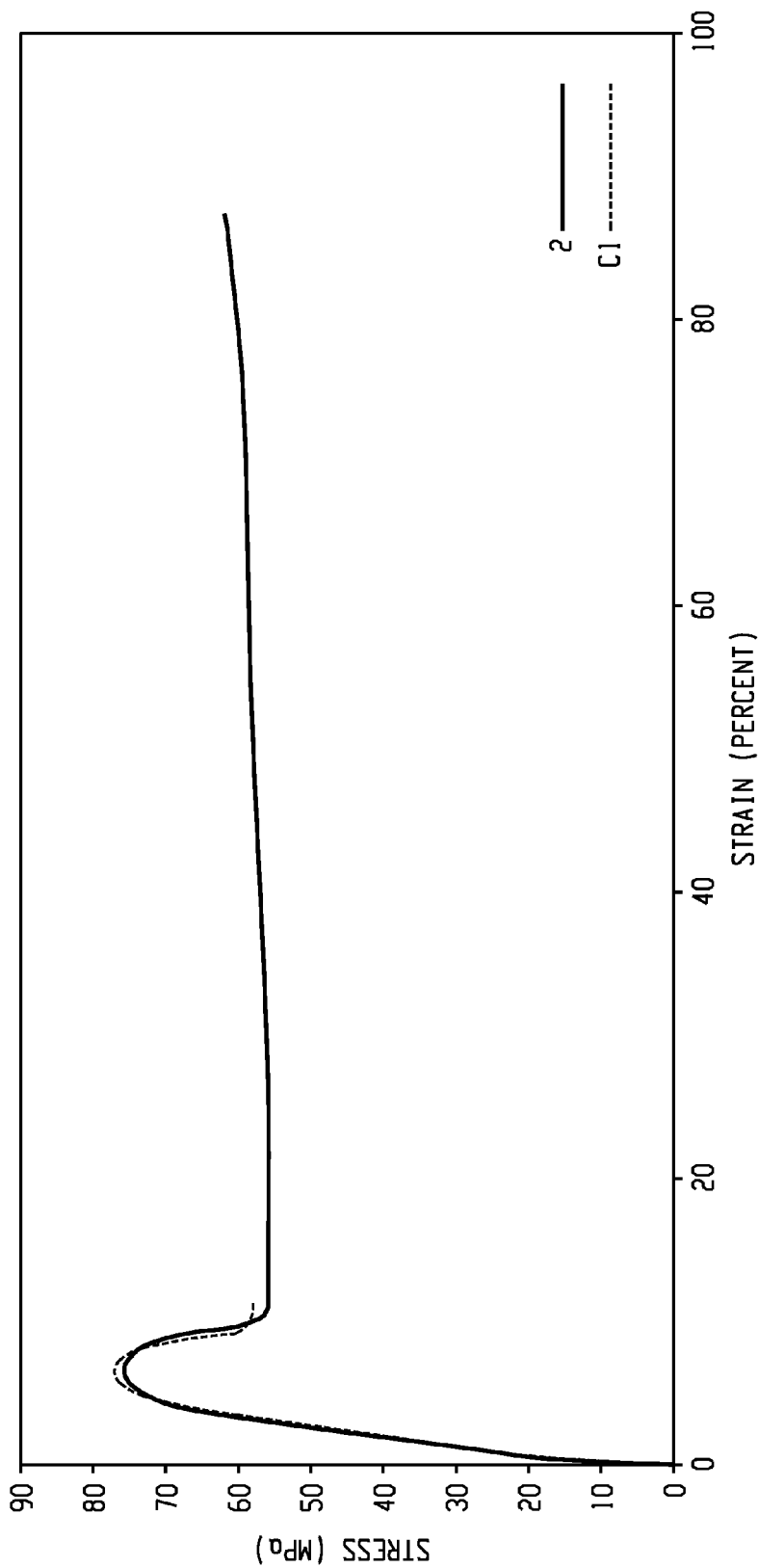
FIG. 4 is a graphical illustration of the stress versus strain of injection molded samples, re-processed at various temperatures from PPO pellets made with and without the use of solid carbon dioxide.
Figure 6:
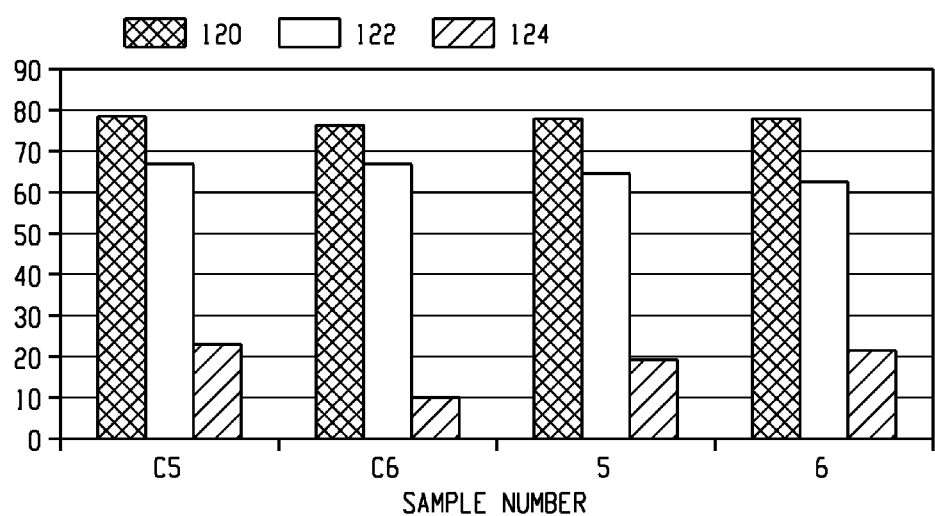
FIG. 6 is a graphical illustration of the stress at yield, stress at break, and strain at break of injection molded samples, re-processed from polycarbonate pellets made with and without the use of solid carbon dioxide at various temperatures.

The molded test bars were also subject to mechanical testing after conditioning as mentioned previously of 23° C. and 50% relative humidity for 48 hours. FIGS. 2, 3, and 4 illustrate these results. FIG. 2 is a graphical illustration of the tensile strength of C1 and Samples 1 and 2 showing the stress at yield 100 as measured according to ISO 527 (1997), stress at break 110 as measured according to ISO 527 (1997), and strain at break 112 as measured according to ISO 527 (1997) where stress at yield and break are each measured in MPa and strain is measured in percent (%). FIG. 3 is a graphical illustration of the tensile modulus (e.g., Young's modulus) measured in MPa of C1 and Samples 1 and 2, while FIG. 6 is a graphical illustration of the stress versus strain of C1 and Sample 2.

As can be seen from FIGS. 2, 3, and 4, Samples 1 and 2 gave a higher percentage of tensile elongation as compared to C1, processed at the high temperature profile. Additionally, the low temperature processing profile of Sample 2 gave a higher percentage of tensile elongation as compared to Sample 1. FIG. 3 illustrates that the tensile modulus of Samples 1 and 2 was comparable to that of C1. FIG. 4 illustrates that samples processed with the aid of dry ice showed higher elongation to break than samples not processed with dry ice. In the injection molding operation, no dry ice was used. Yet, surprisingly Samples 1 and 2 which were made from pellets which had been processed with solid $CO_2$ seemed to show a memory, meaning that PPO pellets made by solid $CO_2$ processing gave better injection molded products compared with pellets made without solid $CO_2$.

Further samples were prepared and tested for mechanical properties such as tensile modulus (MPa), stress at yield (MPa), stress at break (MPa), and strain at break (%) as described above. Extrusion processing conditions are set forth in Tables 5 and 6 and results in Tables 7 and 8, where Table 8 relates to results after the samples have been subjected to heat aging at 160° C. for 72 hours. Table 6 refers to production rate, which is measured in grams per minute (g/min). As seen in Table 6, in the presence of dry ice, the feed rate of the material can be significantly increased, while at the same time the rate at which one can produce pellets also increases giving rise to significant improvement in productivity.

TABLE 5

Extrusion Temperature Profile

| | | Barrel | | | | | | | | | |
|---|---|---|---|---|---|---|---|---|---|---|---|
| | | 1 | 2 | 3 | 4 | 5 | 6 | 7 | 8 | 9 | 10 |
| Sample No. | Process | Temperature (° C.) | | | | | | | | | |
| C3 and 3 | High Temperature | 100 | 220 | 265 | 275 | 285 | 285 | 290 | 290 | 295 | 300 |
| C4 and 4 | Low Temperature | 100 | 220 | 250 | 260 | 260 | 260 | 260 | 260 | 265 | 270 |

TABLE 6

Process Parameters

| | Sample No. | | |
|---|---|---|---|
| | C3 | 3 | % of Increment |
| Screw Speed (rpm) | 300 | 300 | N/A |
| Feed Rate (kg/hr) | 8.5 | 13.6 | 160 |
| Torque (%) | 49-56 | 50-57 | |
| Production rate of pellets (g/min) | 134 | 200 | 149.3 |

TABLE 7

Mechanical Properties Before Heat Aging

| | Sample No. | | | |
|---|---|---|---|---|
| Tensile Properties | C3 | C4 | 3 | 4 |
| Modulus (MPa) | 2451.0 (6.56) | 2373.0 (67.0) | 2338 (86.95) | 2407 (36.26) |
| Stress at yield (MPa) | 75 (0.87) | 73.60 (0.59) | 74.5 (0.14) | 75.66 (0.48) |
| Stress at break (MPa) | 57.1 (0.25) | 57.54 (2.46) | 60.48 (1.33) | 55.86 (1.23) |
| Strain at break (%) | 9.95 (3.08) | 71 (13.1) | 81.93 (4.13) | 43.06 (6.08) |

TABLE 8

Mechanical Properties After Heat Aging

| | Sample No. | |
|---|---|---|
| Tensile Properties | C3 | 4 |
| Modulus (MPa) | 2559.50 | 2509.67 |
| Stress at break (MPa) | 72.55 | 71.13 |
| Strain at break (%) | 4.19 | 4.18 |

As illustrated by Comparative Samples 3 and 4 (C3 and 4) and Samples 3 and 4, the use of solid $CO_2$ shows a plasticizing effect that reduced the torque with the same screw speed and allowed the feed rate to be increased, which also increased the production rate. For example, as demonstrated in Table 6, Sample 3 has a nearly 50% improvement in the production rate as compared to C3, which did not utilize solid $CO_2$.

Example 2

Polycarbonate having the structure illustrated in Formula (10) (i.e., PPPBP PC), which has a glass transition temperature of 180° C. to 220° C. was pelletized with and without solid $CO_2$, as described above. Table 10 lists the compositions for the samples in Table 9. Temperature was measured in degrees Celsius (° C.) and feed rate was measured in 10 kilograms per hour (kg/hr). In Samples 4 and 5, which contained 100 parts PPPBP PC and 50 parts solid $CO_2$, the solid $CO_2$ was crushed into a free flowing powder form and mixed with the PPPBP PC powder and then fed into the extruder. Pellets were formed from compositions using the formulations and processing conditions for listed in Tables 9 and 10.

TABLE 9

Temperatures for extrusion of PPPBP PC

| | | Barrel No. | | | | | | | |
|---|---|---|---|---|---|---|---|---|---|
| Sample No. | Process | 1 | 2 | 3 | 4 | 5 | 6 | Die | Feed Rate (10 kg/hr) |
| | | | | Temperature (° C.) | | | | | |
| C5 and 5 | High Temperature | 100 | 260 | 275 | 280 | 290 | 300 | 300 | 10 |
| C6 and 6 | Low Temperature | 100 | 230 | 240 | 245 | 245 | 245 | 250 | 10 |

TABLE 10

Composition for PPPBP PC Samples

| | Sample No. | |
|---|---|---|
| | C5 and C6 | 5 and 6 |
| PPPBP PC | 100 | 100 |
| Solid $CO_2$ | 0 | 50 |
| Total | 100 | 150 |

C5, C6, Sample 5, and Sample 6 were compounded into pellets and the pellets were then pre-dried and molded using a 60 ton (T) L&D injection molding machine under the same molding conditions, which are listed in Table 11. No dry ice was used in the extruder of the injection molding machine. The mold delivered bars having a length of 170 mm, width of 10 mm, and height of 4.0 mm The mold temperature was 135° C., screw speed was 75 rpm, injection pressure was 85 Bar (8.5 MegaPascals (MPa), cooling time was 10 seconds, back pressure was 5 Bar (0.5 MPa), and hold time was 2 seconds. Tensile testing was then conducted on the molded bars having a length of 170 mm, width of 10 mm, and height of 4.0 mm after the samples were conditioned for 48 hours at 23° C. and 50% relative humidity. The tensile testing was conducted on a Zwick 010 tensile machine with a 1 millimeter per minute (mm/min) pulling speed 1 with up to 1% elongation and a pulling speed 2 of 50 mm/min up to break.

TABLE 11

Injection Molding Processing Conditions

| Zone | Nozzle | 3 | 2 | 1 | Feed | Oil Temperature (° C.) |
|---|---|---|---|---|---|---|
| Temperature (° C.) | 330 | 325 | 300 | 285 | 60 | 40 |

As can be seen in Table 12, PPPBP PC samples containing solid $CO_2$ can be processed at lower torque ranges than PPPBP PC samples not containing solid $CO_2$ (i.e., C5 versus Sample 5, C6 versus Sample 6). For example, samples containing solid $CO_2$ can be processed at lower torque values of greater than or equal to 15%, specifically, greater than or equal to 20%, even more specifically, greater than or equal to 25%, and still more specifically, greater than or equal to 30% in a high temperature process and greater than or equal to 10% in a low temperature process. These results demonstrate that PPPBP PC containing solid $CO_2$ can be processed at lower temperatures with less torque, which can help save energy with lower power consumption for heaters and the extruder motor drive, while pelletizing the powder. It can be expected for this effect to also extend if other products are extruded (e.g., film, sheet of polycarbonate).

TABLE 12

Torque Parameters

| Sample No. | | |
|---|---|---|
| C5 | Torque (%) High Temperature Process | 37-38 |
| C6 | Torque (%) Low Temperature Process | 40-43 |
| 5 | Torque (%) High Temperature Process | 28-32 |
| 6 | Torque (%) Low Temperature Process | 33-34 |

Figure 5:
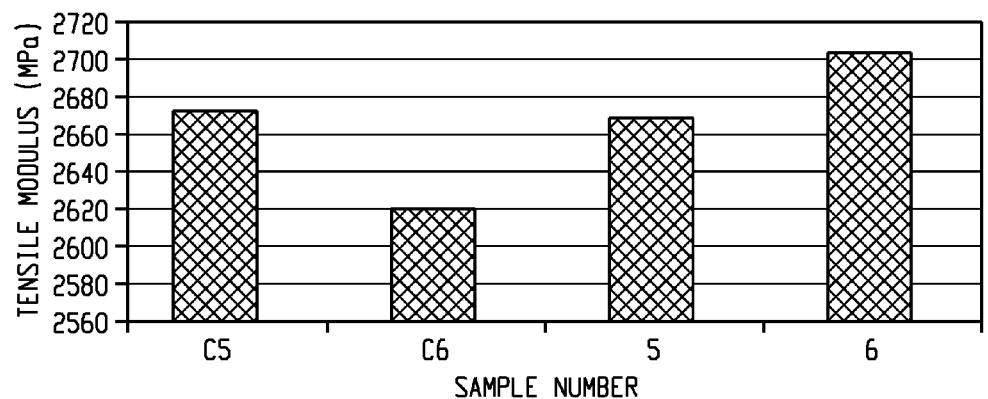
FIG. 5 is a graphical illustration of the tensile modulus of injection molded samples, re-processed at various temperatures from polycarbonate pellets made with and without the use of solid carbon dioxide.

The molded test bars were also subject to mechanical testing after conditioning as mentioned previously of 23° C. and 50% relative humidity for 48 hours. FIGS. 5 and 6 illustrate these results. FIG. 5 is a graphical illustration of the tensile modulus measured in MPa as measured according to ISO 527 (1997) of Comparative Samples 5 and 6 (C5 and C6) and Samples 5 and 6 showing that Samples 5 and 6, made with solid $CO_2$ have a higher modulus than the samples not made with solid $CO_2$. FIG. 6 is a graphical illustration of the stress at yield 120 in MPa as measured according to ISO 527 (1997), the stress at break 122 in MPa as measured according to ISO 527 (1997), and strain at break 124 in % as measured according to ISO 527 (1997).

As can be seen from FIG. 5, Sample 6, processed at the low temperature profile, gave a higher tensile modulus value compared to the comparative samples processed without solid $CO_2$, processed at either the high temperature or low temperature profile. FIG. 6 illustrates that there was not a significant difference in tensile stress yield and the strain at break values.

Overall, as observed with PPO, when PC powder is converted to pellets using a solid $CO_2$ plasticized extrusion process, the benefits are felt even during secondary processing operation such as injection molding. This is surprising because it appears as though virtually no $CO_2$ is left in the pellets after the solid $CO_2$ plasticized extrusion process. It was unexpected that in a secondary process such as injection molding, the effect of using $CO_2$ in the previous process would lead to better properties in the articles made in the secondary extrusion process when no $CO_2$ was used.

Figure 7:
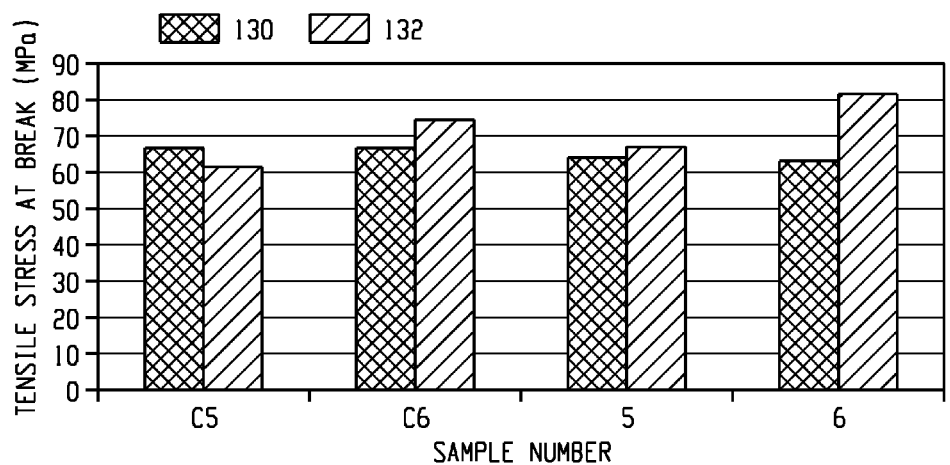
FIG. 7 is a graphical illustration of the stress at break of heat-aged injection molded samples, re-processed at various temperatures from polycarbonate pellets made with and without the use of solid carbon dioxide.
Figure 8:
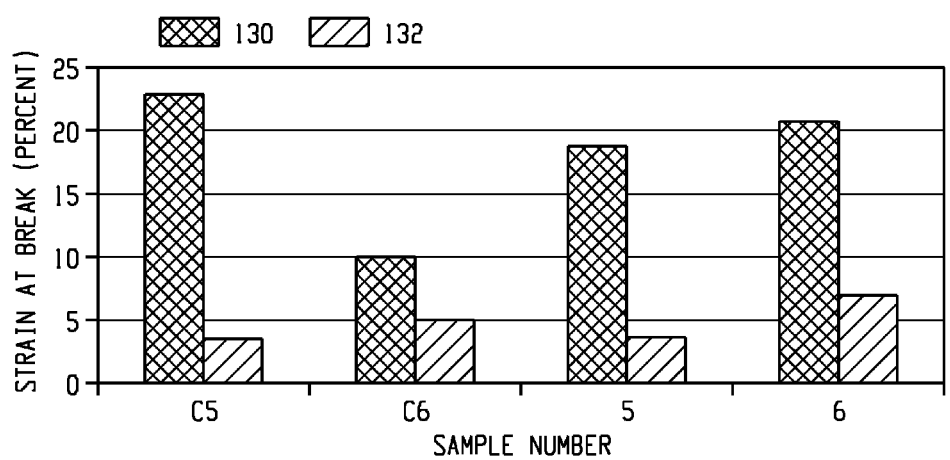
FIG. 8 is a graphical illustration of the strain at break of heat-aged injection molded samples, re-processed at various temperatures from polycarbonate pellets made with and without the use of solid carbon dioxide.

Further samples were prepared and tested for mechanical properties after a heat aging test where the samples were subjected to a temperature of 160° C. for 72 hours. Results are illustrated in FIGS. 7 and 8. As can be seen in FIG. 7, Sample 6, processed with solid $CO_2$, at the lower temperature profile, gave a higher tensile stress at break value than either of C5 or C6 and was even higher than the value of Sample 5, which was also processed with solid $CO_2$, but at the higher temperature profile. The data illustrated by line 130 was before heat aging, while line 132 represents data for the samples after heat aging. FIG. 8 illustrates that Sample 6 had the highest strain at break value after aging; thus, Sample 6 was able to retain more mechanical strength as compared to the other samples.

C5 and C6 and Samples 5 and 6 were further subjected to optical testing. Transparency is described by two parameters, percent transmission and percent haze. Haze and transmission were measured on a BYK-Gardner Haze Guard plus Haze meter according to ASTM D1003-00. Percent transmission and percent haze for laboratory scale samples were determined using ASTM D1003-00, procedure B using CIE standard illuminant C.

ASTM D-1003-00 (Procedure B, Spectrophotometer, using illuminant C with diffuse illumination with unidirectional viewing), wherein transmittance is defined as:

$$\% T = \left(\frac{I}{I_O}\right) \times 100\% \quad \text{(II)}$$

wherein:
I=intensity of the light passing through the test sample
$I_o$=Intensity of incident light
Haze is measured in accordance with ASTM D-1003-00, Procedure A, measured, e.g., using a HAZE-GUARD DUAL from BYK-Gardner, using and integrating sphere (0°/diffuse geometry), wherein the spectral sensitivity conforms to the CIE standard spectral value under standard lamp D65.

Yellowness index was measured by a Macbeth Color Eye 7000A Spectrophotometer using a Standard CIE Lab Equation according to ASTM D1003-00, procedure B measured with D65 illuminant, 10° observer, CIE (Commission Internationale de L'Eclairage) (1931), and SCI (specular component included), and UVEXC (i.e., the UV component is excluded).

As can be seen from Table 13, the yellowness index of Sample 5 is greatly reduced as compared to C5 and that of Sample 6 is greatly reduced as compared to C6. A reduction in the yellowness index will finally help in the improvement of the aesthetic properties of the articles made from the resin.

TABLE 13

Optical Data

| Optical Properties | Sample No. | | | |
|---|---|---|---|---|
| | C5 | C6 | 5 | 6 |
| % Transparency | 88.55 | 86.67 | 85.13 | 86.57 |
| % Haze | 2.26 | 2.90 | 3.33 | 2.90 |
| Yellowness Index | 26.71 | 19.93 | 12.08 | 13.16 |

Example 3

Further tests were conducted with PPO to demonstrate the advantages of processing compositions in an extruder using dry ice (i.e., solid $CO_2$). A high temperature profile and a low temperature profile were used to compare samples. Comparative Samples 7 and 8 (C7 and C8) comprised 100% PPO without using solid $CO_2$, e.g., neat PPO with C7 processed at the high temperature profile and C8 processed at the low temperature profile. The PPO used had an intrinsic viscosity of 0.46 dL/g. Samples 7 to 10 varied in the amount of solid $CO_2$, as illustrated in Table 15. Samples 7, 8, and 10 were processed at the low temperature profile, while Sample 9 was processed at the high temperature profile. Table 16 shows the results from the high temperature processing and Table 17 shows the results from the low temperature processing.

TABLE 14

PPO Extrusion- Temperature profile

| | Barrel Zone No. and Temperature (° C.) | | | | | | |
|---|---|---|---|---|---|---|---|
| | 1 | 2 | 3 | 4 | 5 | 6 | Die |
| High Temperature | 200 | 270 | 275 | 285 | 285 | 295 | 300 |
| Low Temperature | 200 | 240 | 245 | 250 | 250 | 255 | 260 |

TABLE 15

Formulations

| Description | C7 and C8 | 7 | 8 | 9 and 10 |
|---|---|---|---|---|
| PPO | 100 | 100 | 100 | 100 |
| Solid $CO_2$ | 0 | 10 | 20 | 50 |
| Total | 100 | 110 | 120 | 150 |

TABLE 16

Results with Die at 300° C.

| | Sample | |
|---|---|---|
| | C7 | 9 |
| Extrusion parameters | Without Solid $CO_2$ | With 50 wt. % Solid $CO_2$ |
| Screw speed (rpm) | 300 | 300 |
| Feed rate (kg/hr) | 10 | 10 |
| Torque (%) | 40-45 | 30-35 |

TABLE 17

Results with Die at 260° C.

| | Sample | | | |
|---|---|---|---|---|
| | C8 | 7 | 8 | 10 |
| Extrusion parameters | Without Solid $CO_2$ | With 10 wt. % Solid $CO_2$ | With 20 wt. % Solid $CO_2$ | With 50 wt. % Solid $CO_2$ |
| Screw speed (rpm) | 300 | 300 | 300 | 300 |
| Feed rate (kg/hr) | Cannot extrude | 10 | 10 | 10 |
| Torque (%) | | 42-48 | 40-45 | 35-38 |

As can be seen from the data in Table 16, the use of solid $CO_2$ in the high temperature process reduced the torque by greater than or equal to 20%, specifically, greater than or equal to 25%, more specifically, greater than or equal to 30%, and even more specifically, greater than or equal to 33%. Samples 7, 8, and 10 each show a 100% improvement in torque over C8, which could not be extruded at the lower temperature of 260° C. in the die. Thus, the use of solid $CO_2$ in the extrusion of PPO can allow extrusion at lower temperatures, while giving extrudates with improved properties.

Figure 9:
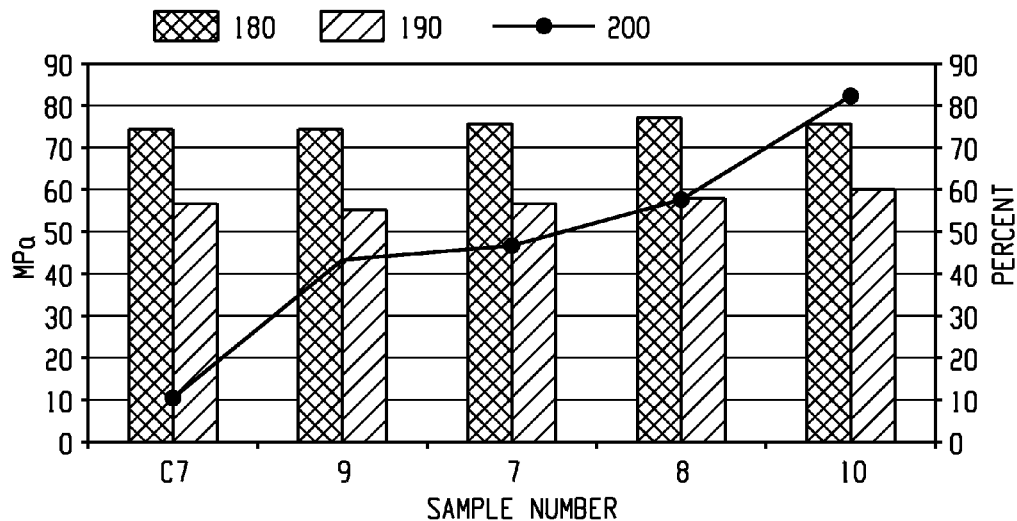
FIG. 9 is a graphical illustration of the stress at yield, stress at break, and strain at break of injection molded samples, re-processed from PPO pellets made with and without the use of solid carbon dioxide at various temperatures.

FIG. 9 is a graphical illustration of the stress at yield 180 (MPa), stress at break 190 (MPa), and strain at break 200(%) of C7 and Samples 7-10. Remembering all the test tensile test specimens were injection molded without using $CO_2$, it can be seen from FIG. 9 that primary processing (i.e. pelletization) with solid $CO_2$ increases the elongation-at-break of the molded samples, which signifies increase in toughness.

Figure 10:
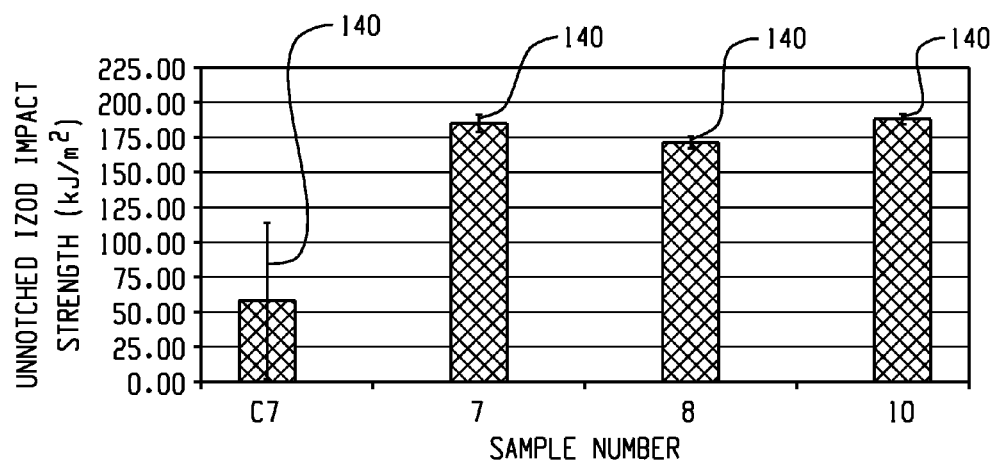
FIG. 10 is a graphical illustration of the unnotched Izod impact strength of injection molded samples, re-processed from PPO pellets made with and without the use of solid carbon dioxide at various temperatures.

FIG. 10 illustrates the results from unnotched Izod impact strength tested according to ISO 180 (2000). Again, the Izod samples were made without using $CO_2$ in the actual injection molding, and the reference to $CO_2$ is to the primary extrusion process to make pellets. Neat PPO (C7) was processed and compared with compositions containing PPO with 10 wt. % (Sample 7), 20 wt. % (Sample 8), and 50 wt. % (Sample 10) solid $CO_2$ using the low temperature profile as set forth in Table 13. Impact strength was measured in kiloJoules per square meter ($kJ/m^2$). As can be seen from FIG. 10, there was a three-fold increase in the unnotched Izod impact strength values for PPO processed with solid $CO_2$. In contrast, a wide variation of impact strength was observed in PPO due to the presence of cracks in the Izod bars molded from pellets that had not been made with $CO_2$ plasticization. However, with the Izod bars molded from pellets made via solid $CO_2$ plasticized extrusion, the stress dissipation was better and more consistent which helps give higher impact strength values and a lower standard deviation 140.

Figure 11:
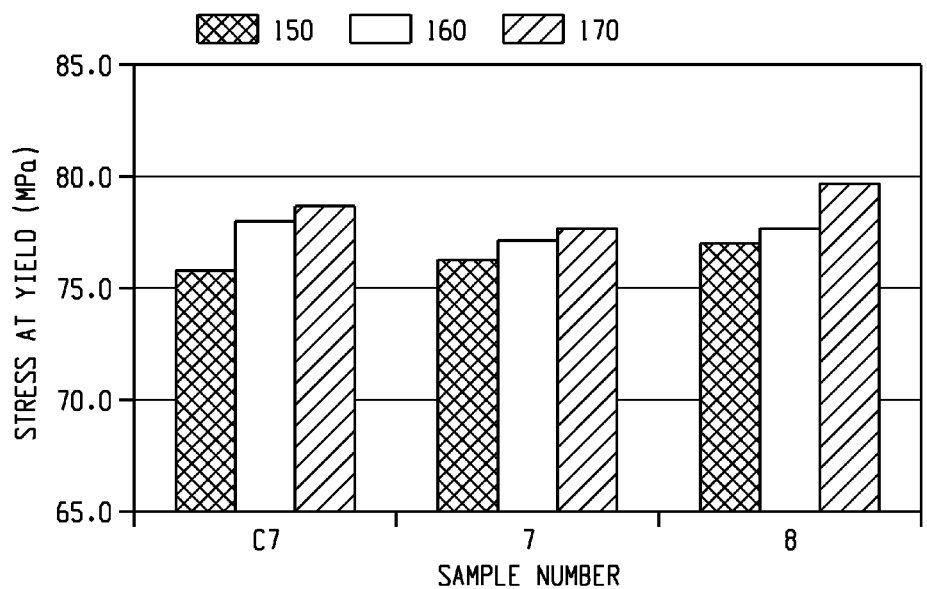
FIG. 11 is a graphical illustration of stress at break of heat-aged injection molded samples, re-processed at various temperatures from PPO pellets made with and without the use of solid carbon dioxide.
Figure 12:
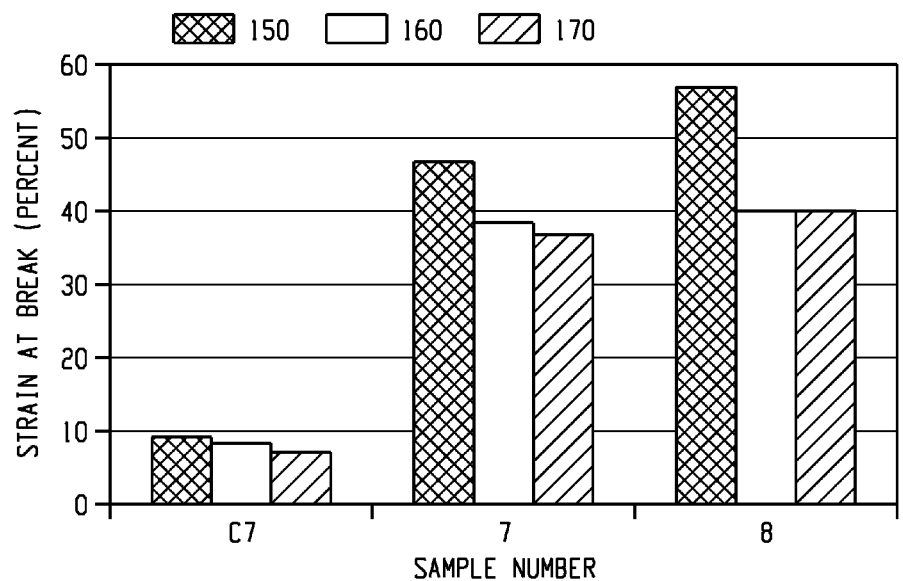
FIG. 12 is a graphical illustration of the strain at break of heat-aged injection molded samples, re-processed at various temperatures from PPO pellets made with and without the use of solid carbon dioxide.

FIG. 11 is a graphical illustration of the stress at yield of samples processed using neat PPO (C7) and samples containing neat PPO and 10 wt. % (Sample 7) and 20 wt. % (Sample 8) solid $CO_2$ where the samples were subject to heat aging at 90° C. and tested after 0 days illustrated by line 150, 7 days illustrated by line 160, and 14 days illustrated by line 170. FIG. 12 is a graphical illustration of the strain at break of samples processed using neat PPO (C7), samples containing neat PPO and 10 wt. % (Sample 7) and 20 wt. % (Sample 8) solid $CO_2$ where the samples were subject to heat aging at 90° C. and tested after 0 days illustrated by 150, 7 days illustrated by 160, and 14 days illustrated by 170. As can be seen from FIG. 12, the samples made from pellets processed with solid $CO_2$ were able to retain significantly higher levels of ductility as compared to samples made from pellets processed without solid $CO_2$. The in-mold stress is high in C7 where no dry-ice was used. During the aging process, in-mold stresses are released and mechanical property retention is observed. Samples 7, 8, and 9, processed with solid $CO_2$, already had very low in-mold stress and hence retention of mechanical properties was even better than samples processed without solid $CO_2$.

More samples were made and tested for mechanical properties including tensile modulus (MPa), stress at yield (MPa), strain at yield (%), stress at break (MPa), and strain at break (%) according to the ISO standards previously described. Comparative Samples C9 to C13 comprised 100% PPO (i.e., neat PPO) and were processed using the high temperature profile, while Samples 11-20 comprised 50% solid $CO_2$ and were processed using the low temperature profile. Results are illustrated in Tables 18, 19, and 20.

TABLE 18

High Temperature Mechanical Properties without solid $CO_2$

| Sample No. | Modulus (MPa) | Stress at Yield (MPa) | Stress at Break (MPa) | Strain at Yield (%) | Strain at Break (%) |
|---|---|---|---|---|---|
| C9 | 2457 | 76.6 | 58 | 5.4 | 10.22 |
| C10 | 2448 | 74.54 | 58.3 | 5.72 | 7.85 |
| C11 | 2458 | 76.56 | 57.1 | 5.63 | 12.65 |
| C12 | 2544 | 75.34 | 58 | 5.51 | 9.126 |
| C13 | 2408 | 76.5 | 57.3 | 5.74 | 15.23 |
| Average | 2463.00 | 75.91 | 57.74 | 5.60 | 11.02 |
| Standard Deviation | 49.68 | 0.93 | 0.51 | 0.14 | 2.94 |

TABLE 19

Low Temperature Mechanical Properties with 50% solid $CO_2$

| Sample No. | Modulus (MPa) | Stress at Yield (MPa) | Stress at Break (MPa) | Strain at Yield (%) | Strain at Break (%) |
|---|---|---|---|---|---|
| 11 | 2393 | 73.4 | 58.7 | 6.29 | 78.02 |
| 12 | 2458 | 73.5 | 58.3 | 6.25 | 74.54 |
| 13 | 2424 | 73.3 | 61.7 | 6.27 | 88.56 |
| 14 | 2421 | 74 | 59 | 6.22 | 74.51 |
| 15 | 2414 | 74.9 | 57.9 | 6.28 | 77.16 |
| Average | 2422 | 73.82 | 59.12 | 6.26 | 78.558 |
| Standard Deviation | 23.48 | 0.66 | 1.5 | 0.03 | 11.3 |

TABLE 20

Low Temperature Mechanical Properties with 50% solid $CO_2$

| | Modulus (MPa) | Stress at Yield (MPa) | Stress at Break (MPa) | Strain at Yield (%) | Strain at Break (%) |
|---|---|---|---|---|---|
| 16 | 2368 | 75.1 | 60.2 | 6.28 | 80.23 |
| 17 | 2378 | 75.5 | 58.8 | 6.28 | 76.45 |
| 18 | 2459 | 75.8 | 61.2 | 6.37 | 83.89 |
| 19 | 2420 | 76.4 | 59.9 | 6.42 | 81.57 |
| 20 | 2412 | 75.5 | 62.3 | 6.32 | 87.53 |
| Average | 2407.4 | 75.66 | 60.48 | 6.33 | 81.93 |
| Standard Deviation | 36.26 | 0.48 | 1.33 | 0.06 | 4.13 |

As can be seen from Tables 18, 19, and 20, modulus, stress at yield, and stress at break values were similar for the samples. However, the strain at break (i.e., elongation) was increased significantly for all of Samples 11-20, and this also signifies increased toughness and matches the trend seen with the Izod impact. The data in Tables 18 and 19 demonstrate that the addition of solid $CO_2$ during processing increases the strain at break significantly; however, all the other mechanical properties were unaffected.

In the ensuing examples a rheometer was used and venting was not possible.

Comparative Example 4

In this example, an attempt was made to measure rheological parameters such as shear viscosity versus shear rate for neat PPO in a capillary rheometer with a barrel diameter of 12 mm. A 1 mm diameter die with a land length of 10 mm was used. PPO powder (PPO 800 commercially available from SABIC Innovative Plastics having an intrinsic viscosity of 0.46 dL/g) was dried and the barrel was loaded at 300° C. The instrument was programmed to take readings at various piston speeds to generate points for the shear viscosity versus shear rate curve.

When the piston was brought down to start the extrusion, no extrudate exited from the die. The polymer melt was too viscous to extrude from the 1 mm diameter die even at 300° C. at the highest pressure attainable (160 MPa). The die was removed and the melt in the barrel was pushed out manually with the piston. The melt was very viscous and was collected as a thick, irregular mass which solidified. Possibly the time delay in packing the rheometer with the polymer powder, tamping it down and compacting, and allowing it to reach the extrusion temperature, was too long compared with the residence time in the extruder experiments of the earlier examples; hence, the PPO starts to degrade and block.

Example 5

In this example, an attempt was made to measure rheological parameters such as shear viscosity versus shear rate for a 50% by weight of solid $CO_2$+50% by weight of the same PPO used in Comparative Example 4. The same capillary rheometer and die were used as in Comparative Example 4. Dried PPO powder was mixed manually with pulverized solid $CO_2$ from a block of dry ice. The mixture was then compacted in the rheometer barrel and held at 300° C. for an equilibration time of 5 minutes. It was believed that this method would lead to the loss of all the $CO_2$ due to back venting during the compaction phase. Also, unlike the vented screw extruder, with the rheometer, venting was not possible before the die exit, hence it was thought that even if some $CO_2$ stayed, the extrudate might not form a recognizable strand due to violent blistering and uncontrolled foaming at the exit. But the results surprisingly showed that enough $CO_2$ stayed with the polymer. The speed of the piston was maintained at 0.1 mm/sec. This time a molten strand was extruded from the 1 mm die, and it could be seen that it had a lighter yellow color compared with the brown melt of neat PPO extracted from the barrel in Comparative Example 4 when the die was removed and the barrel was cleaned. It was surprising to discover that the solid $CO_2$ was reducing the discoloration and also the viscosity. However, most of the $CO_2$ was lost during the filling of the rheometer with the PPO+dry ice mixture and the compaction phase, hence an accurate rheology curve could not be constructed.

After half the $CO_2$ plasticized PPO melt was discharged from the barrel through the die, the die was removed and the remainder of the melt was pushed out manually with the plunger. Whereas in Comparative Example 4, the PPO discharged with difficulty when manually pushed out from the barrel (after removal of the die), as an irregular, thick brown molten blob that clung to the barrel, the PPO melt processed with solid $CO_2$ came out easily from the barrel when it was pushed out without the die. On exit from the barrel, the $CO_2$ plasticized PPO melt dropped spontaneously by gravity because the viscosity was lower than in Comparative Example 4. During the drop, the melt elongated and formed into a stiff strand about 1 meter long. This also showed that the $CO_2$ had decreased the elongational viscosity. Examination of the strand between crossed polars showed that it was birefringent and hence it was oriented. As expected, the rod had elongated pores (this was due to the absence of venting), but surprisingly, despite the presence of pores, it was not brittle. The rod could be bent back on itself without snapping, and it had to be worked back and forth by bending back on itself to break it.

The experiment with solid $CO_2$ in the rheometer did not have as much control as the extruder experiment, as the amount of $CO_2$ left in the polymer after compaction was unknown but it will be significantly lower than the input. The fact that there was no violent foaming in the extrudate suggests that not much $CO_2$ was actually present by the time of extrusion. Nevertheless, the rheometer experiment confirmed that the use of solid $CO_2$ reduces the shear viscosity sufficiently to allow extrusion of PPO even from a fine 1 mm die. The formation of oriented strands (when the $CO_2$ plasticized PPO melt fell under gravity) indicates a reduction in elongational viscosity and this points to the possibility of fine fiber spinning potential of solid $CO_2$ plasticized PPO.

Comparative Example 6

The experiments with the extrusion of PAN were done in a capillary rheometer, first using pure (i.e., neat) PAN (Comparative Example 6) and secondly in Example 7 with a powder blend of 50% solid $CO_2$+50% pure PAN. In this comparative example, an attempt was made to extrude PAN homopolymer (commercially available from Aldrich having a number average molecular weight of 150,000) without dry ice, using a rheometer. The barrel diameter was 12 mm and a die having a large diameter of 4.0 mm was selected to extrude rods. In Comparative Example 6, an attempt was made to extrude neat PAN homopolymer at 2 millimeters per minute (mm/min) through the 4 mm die at 180° C., without any $CO_2$. As the size of the die (4 mm) was much bigger than the powder size, the powder would have fallen out through the die if introduced directly to the barrel.

The rheometer barrel was therefore sealed initially with a blank die (i.e., with no hole), and dry PAN powder was placed in the barrel which had been pre-heated to 180° C., and tamped down to remove the air; the piston was driven down until a pressure of 7 MPa was reached and the polymer was held under compression for 5 minutes. It was found the PAN powder was difficult to compact, even when the piston was driven down. The pressure was removed, the blank die insert was removed, and the 4 mm capillary die was inserted. Despite the large hole size, the melt did not fall out due to gravity, because of its extreme viscosity. However, even when the piston was brought down at 2 mm/min, the molten billet inside the barrel was too viscous to extrude through the 4 mm die, even though the pressure reached 160 MPa. The piston was retracted, the die was removed, and the molten billet was pushed out as a solid, cylindrical plug. The neat PAN melt was even more viscous than the PPO melt, as can be seen by the fact that it would not extrude from a 4 mm die. The billet was transparent but amber tinted.

Example 7

In this example, a 50% dry ice powder+50% PAN homopolymer powder was extruded, in the rheometer. Unlike the vented screw extruder, the equipment was not set up optimally for this, because the $CO_2$ could not be vented out before the die exit; it was expected this would lead to foaming of the extrudate. The mixture of PAN powder and dry ice powder was prepared and mixed together manually. The barrel was pre-heated to 180° C. Again, the end was blocked with the holeless die insert and the powder mixture was compacted manually. After this, the piston was driven down to compact it to a pressure of 7 MPa (holding time was 5 minutes at 180° C.). It was noted that the compaction of the powder was easier with the $CO_2$. It is assumed that liquid $CO_2$ is formed under pressure during compaction and this penetrates into the porous PAN powder, and lubricates it, allowing the powder particles to coalesce better. It was anticipated that much of $CO_2$ might escape during the time when the dry ice+PAN powder mix was placed in the barrel and manually tamped and then compacted by driving the piston down until a compaction pressure of 7 MPa was achieved. After compaction and temperature equilibration, the holeless die was replaced with the 4 mm diameter die and the piston was driven down at 2 mm/min. Now, an extrudate emerged from the 4 mm die. In Comparative Example 6, where no $CO_2$ was added, it was found that no extrudate would come out from the 4 mm die even when a pressure of 160 MPa was reached. It was also noticed that the color of the PAN extrudate from the 4 mm die was pale yellow instead of amber. The extrudate showed a high degree of melt fracture and a rough surface. Sample 7 nevertheless demonstrated that solid $CO_2$ reduces the viscosity of the PAN, making it extrudable from a 4 mm die. The amount of $CO_2$ left was unknown and less than 50% but this experiment proves that the $CO_2$ lowers the melt viscosity, and using solid $CO_2$ reduces the discoloration. As there was no evidence for foaming in the extrudate, it would suggest that the actual amount of $CO_2$ at the time of the rheometer extrusion was very low, and this led to the high melt fracture.

The PAN homopolymer can be used when the products of dry ice assisted extrusion are profiles such as sheets, rods, and pipes. A PAN copolymer with 1% to 10% methyl acrylate or vinyl acetate can be used if the aim is to make fine filaments and/or fibers. A composition with 1.5 wt. % of itaconic acid, acrylic acid, or methacrylic acid can be used when the products of dry ice assisted extrusion are carbon fiber precursors.

In an embodiment, a method of processing a polymer comprises: mixing polymer and solid carbon dioxide; introducing the polymer and solid carbon dioxide mixture to a hopper of a vented extruder; plasticizing the mixture to form a polymer melt with dissolved carbon dioxide; venting carbon dioxide as a gas before the die exit; and extruding the polymer melt through a die.

In an embodiment, a method of making a polymer comprises: introducing a pre-mixed polymer and solid carbon dioxide mixture to a vented extruder; plasticizing the mixture; venting gas from the extruder; and extruding the polymer through a die.

In an embodiment, a method of making an extrudate comprises: plasticizing a polymer with solid carbon dioxide to form a melt; venting gaseous carbon dioxide before a die exit; and extruding the melt through a die to form the extrudate.

In an embodiment, a method of making an article comprises: introducing a polymer powder to an extruder; introducing solid carbon dioxide powder to the extruder at the hopper; plasticizing and extruding the polymer and solid carbon dioxide mixture; venting the solid carbon dioxide before the die exit; extruding the polymer melt through a die to form pellets; and injection molding the polymer pellets without solid carbon dioxide to form molded articles.

In the various embodiments, (i) the extrusion temperature is lowered less than or equal to 80° C. below the degradation temperature of the polymer; and/or (ii) the extrusion temperature is lowered 45° C. to 55° C. below the degradation temperature of the polymer; and/or (iii) the polymer comprises polar groups and/or aromatic rings; and/or (iv) the polymer is selected from the group consisting of polyphenylene ether-based resin, polyacetal-based resin, polyamide-based resin, polystyrene-based resin, acrylic resin, polyester-based resin, polycarbonate, polyphenylene sulfide, polyetherimide, polyethersulfone, polysulfone, polyether (ether) ketone, poly(tetrafluoroethylene), polyvinyl chloride, and combinations comprising at least one of the foregoing; and/or (v) the solid carbon dioxide is in the form of a powder or pellet; and/or (vi) the method further comprises introducing the polymer and the solid carbon dioxide to a throat of the vented extruder; and/or (vii) the method further comprises introducing the polymer and the solid carbon dioxide to a hopper prior to introduction to the throat of the vented extruder; and/or (vii) the method further comprises introducing the polymer and the solid carbon dioxide to the vented extruder separately; and/or (viii) the method further comprises forming an article from the polymer; and/or (ix) the method further comprises forming fibers from the extrudate with a melt spinning spinneret die, wherein the fiber size is less than 100 micrometers in diameter; and/or (x) the acrylic polymer is polyacrylonitrile; and/or (xi) the method further comprises processing the polyacrylonitrile in the extruder at a temperature of 150° C. to 200° C.; and/or (xii) the polymer comprises less than 20% comonomer; and/or (xiii) the polymer comprises less than 10% comonomer; and/or (xiv) the method further comprises forming an article from the polyacrylonitrile; and/or (xv) the method further comprises forming profiles, pellets, filaments, films, sheets, and combinations comprising at least one of the foregoing from the extrudate using a die; and/or (xvi) the profiles comprise a rod or a tube with a diameter of greater than or equal to 1 millimeter; and/or (xvii) the method further comprises extruding the polymer through a strand die to form a strand or multi-strands and pelletizing the strand or multi-strands; and/or (xviii) the pellets are subsequently re-processed with or without solid carbon dioxide; and/or (xix) the re-processing is by a method selected from the group consisting of injection molding, filament spinning, film extrusion, sheet extrusion, pipe extrusion, and profile extrusion; and/or (xx) the polymer is selected from the group consisting of polyphenylene ether, polyacrylonitrile, polyvinyl chloride, polytetrafluoroethylene; and combinations comprising at least one of the foregoing; and/or (xxi) the method further comprises recovering the vented gaseous carbon dioxide and converting the gaseous carbon dioxide to solid carbon dioxide in a closed loop without releasing carbon dioxide to the atmosphere; and/or (xxii) the method further comprises melt spinning filaments, wherein the method comprises applying a threadline tension to draw fibers having a diameters of less than or equal to 100 micrometers; and/or (xxiii) the method further comprises post drawing the fibers; and/or (xxiv) the polyphenylene ether consists of less than 15 wt. % of a combined total of another polymer selected from the group consisting of polystyrene, polyester, polyimide, polyamide, polypropylene, and combinations comprising at least one of the foregoing.

In general, the compositions disclosed herein can alternately comprise, consist of, or consist essentially of, any appropriate components herein disclosed. The compositions disclosed herein can additionally, or alternatively, be formulated so as to be devoid, or substantially free, of any components, materials, ingredients, adjuvants or species used in the prior art compositions or that are otherwise not necessary to the achievement of the function and/or objectives of the present compositions.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method of processing a polymer, comprising:
    mixing polymer and solid carbon dioxide, wherein the polymer comprises polar groups and/or aromatic rings, wherein the polymer includes polyacrylonitrile;
    introducing the polymer and solid carbon dioxide mixture to a vented extruder having a die exit;
    plasticizing the mixture to form a polymer melt with dissolved carbon dioxide;
    venting carbon dioxide as a gas before the die exit; and
    extruding the polymer melt through a die; and
    at least one of processing the polyacrylonitrile in the extruder at a temperature of 150° C. to 200° C.; and wherein the polymer comprises less than 20% comonomer.

2. The method of claim 1, wherein the extrusion temperature is lowered less than or equal to 80° C. below the degradation temperature of the polymer.

3. The method of claim 2 wherein, the extrusion temperature is lowered 45° C. to 55° C. below the degradation temperature of the polymer.

4. The method of claim 1, wherein the polymer further includes polyphenylene ether, polyvinyl chloride, polytetrafluoroethylene, or combinations comprising at least one of the foregoing.

5. The method of claim 1, wherein the polymer further includes polyphenylene ether-based resin, polyacetal-based resin, polyamide-based resin, polystyrene-based resin, acrylic resin, polyester-based resin, polycarbonate, polyphenylene sulfide, polyetherimide, polyethersulfone, polysulfone, polyether (ether) ketone, poly(tetrafluroethylene), polyvinyl chloride, or combinations comprising at least one of the foregoing.

6. The method of claim 1, wherein the solid carbon dioxide is in the form of a powder or pellet.

7. A method of making a polymer, comprising:
introducing a pre-mixed polymer and solid carbon dioxide mixture to a vented extruder, wherein the polymer comprises polar groups and/or aromatic rings, wherein the polymer includes polyacrylonitrile;
plasticizing the mixture;
venting gas from the extruder; and
extruding the polymer through a die; and
at least one of
processing the polyacrylonitrile in the extruder at a temperature of 150° C. to 200° C.; and
wherein the polymer comprises less than 20% comonomer.

8. The method of claim 7, wherein the polymer and solid carbon dioxide are introduced at a throat of the vented extruder.

9. The method of claim 8, further comprising introducing the polymer and the solid carbon dioxide to a hopper prior to introduction to the throat of the vented extruder.

10. The method of claim 7, further comprising introducing the polymer and the solid carbon dioxide to the vented extruder separately.

11. The method of claim 7, further comprising forming an article from the polymer.

12. The method of claim 7, further comprising forming fibers from the extrudate with a melt spinning spinneret die, wherein the fiber size is less than 100 micrometers in diameter.

13. The method of claim 7, wherein the polymer further includes polyphenylene ether-based resin, polyacetal-based resin, polyamide-based resin, polystyrene-based resin, acrylic resin, polyester-based resin, polycarbonate, polyphenylene sulfide, polyetherimide, polyethersulfone, polysulfone, polyether (ether) ketone, poly(tetrafluroethylene), polyvinyl chloride, or combinations comprising at least one of the foregoing.

14. The method of claim 7, wherein the polymer comprises less than 10% comonomer.

15. The method of claim 7, further comprising forming an article from the polyacrylonitrile.

16. A method of making an extrudate, comprising:
plasticizing a polymer with solid carbon dioxide to form a melt, wherein the polymer comprises polar groups and/or aromatic rings;
venting gaseous carbon dioxide before a die exit;
extruding the melt through a die to form the extrudate; and
recovering the vented gaseous carbon dioxide and converting the gaseous carbon dioxide to solid carbon dioxide in a closed loop without releasing carbon dioxide to the atmosphere.

17. The method of claim 16, further comprising forming profiles, pellets, filaments, films, sheets, and combinations comprising at least one of the foregoing from the extrudate using a die.

18. The method of claim 17, wherein the profiles comprise a rod or a tube with a diameter of greater than or equal to 1 millimeter.

19. The method of claim 17, further comprising extruding the polymer through a strand die to form a strand or multi-strands and pelletizing the strand or multi-strands.

20. The method of claim 19, wherein the pellets are subsequently re-processed with or without solid carbon dioxide.

21. The method of claim 20, wherein the re-processing is by a method selected from the group consisting of injection molding, filament spinning, film extrusion, sheet extrusion, pipe extrusion, and profile extrusion.

22. The method of claim 16, wherein the polymer is selected from the group consisting of polyphenylene ether, polyacrylonitrile, polyvinyl chloride, polytetrafluoroethylene, and combinations comprising at least one of the foregoing.

23. The method of claim 16, further comprising melt spinning filaments wherein the method comprises applying a threadline tension to draw fibers having a diameter of less than or equal to 100 micrometers.

24. The method of claim 23, further comprising post drawing the fibers.

25. A method of making an article; comprising:
introducing a polymer powder to an extruder having a hopper and a die exit, wherein the polymer comprises polar groups and/or aromatic rings;
introducing solid carbon dioxide powder to the extruder at the hopper;
plasticizing the polymer and solid carbon dioxide mixture;
venting the solid carbon dioxide before the die exit;
extruding the polymer through a die to form pellets; and
injection molding the pellets without solid carbon dioxide to form molded articles.

26. The method of claim 25, wherein the polymer is selected from the group consisting of polyphenylene ether, polycarbonate, polyacrylonitrile, polyvinyl chloride, polytetrafluoroethylene, and combinations comprising at least one of the foregoing.

27. The method of claim 26, wherein the polyphenylene ether consists of less than 15 wt. % of a combined total of another polymer selected from the group consisting of polystyrene, polyester, polyimide, polyamide, polypropylene, and combinations comprising at least one of the foregoing.

* * * * *